(12) United States Patent
Iwasaki et al.

(10) Patent No.: US 10,703,267 B2
(45) Date of Patent: Jul. 7, 2020

(54) HAPTIC AND VISUAL ATTENTION ATTRACTING DEVICE FOR VEHICLE

(71) Applicant: TOYOTA JIDOSHA KABUSHIKI KAISHA, Toyota-shi (JP)

(72) Inventors: Keita Iwasaki, Toyota (JP); Keiichi Kondo, Chiryu (JP); Akinori Takahashi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/183,253

(22) Filed: Nov. 7, 2018

(65) Prior Publication Data

US 2019/0176696 A1    Jun. 13, 2019

(30) Foreign Application Priority Data

Dec. 8, 2017   (JP) .................................. 2017-236138

(51) Int. Cl.
*B60Q 9/00*      (2006.01)
*G08B 6/00*      (2006.01)
(Continued)

(52) U.S. Cl.
CPC ................ *B60Q 9/00* (2013.01); *B60K 35/00* (2013.01); *B60K 37/06* (2013.01); *B60N 2/90* (2018.02); *B60Q 9/008* (2013.01); *G08B 6/00* (2013.01); *B60K 2370/158* (2019.05); *B60K 2370/178* (2019.05); *B60K 2370/179* (2019.05); *B60K 2370/1868* (2019.05); *B60K 2370/21* (2019.05); *B60N 2002/981* (2018.02)

(58) Field of Classification Search
CPC .. B60K 35/00; B60K 37/06; B60K 2370/129; B60K 2370/158; B60K 2370/178; B60K 2370/1868; B60K 2370/21; B60N 2/0232; B60N 2/40; B60N 2/90; B60N 2002/981; B60Q 9/00; B60Q 9/008; B60R 21/00; B60W 40/08; B60W 50/14; B60W 50/16; G01C 21/36; G01C 21/3697; G08B 6/00
USPC ...................................................... 340/425.5
See application file for complete search history.

(56) References Cited

U.S. PATENT DOCUMENTS 7,245,231 B2   7/2007  Kiefer et al.
9,162,622 B2 * 10/2015  Szczerba ................ G08G 1/166
(Continued)

FOREIGN PATENT DOCUMENTS

JP   2000-20900 A    1/2000
JP   2001-199296 A   7/2001
(Continued)

*Primary Examiner* — Stephen R Burgdorf
(74) *Attorney, Agent, or Firm* — Oblon, McClelland, Maier & Neustadt, L.L.P.

(57) ABSTRACT

An attention attracting device for a vehicle includes an electronic control unit configure to: detect a plurality of types of attention information around an own vehicle; apply vibration, by using a vibrator, to a vehicular seat; display, using a display, an attention information content corresponding to each of the plurality of types of attention information; when the information detection unit detects attention information, operate the vibrator when the attention information is detected and cause a display to display the attention information content corresponding to the detected attention information when the attention information is detected.

17 Claims, 20 Drawing Sheets

(51) Int. Cl.
 *B60N 2/90* (2018.01)
 *B60K 35/00* (2006.01)
 *B60K 37/06* (2006.01)

(56) References Cited

U.S. PATENT DOCUMENTS

| | | | |
|---|---|---|---|
| 9,896,031 B1* | 2/2018 | Groh | B60Q 9/008 |
| 2005/0258977 A1 | 11/2005 | Kiefer et al. | |
| 2005/0259033 A1* | 11/2005 | Levine | B60K 26/00 |
| | | | 345/7 |
| 2005/0273263 A1 | 12/2005 | Egami et al. | |
| 2007/0013497 A1* | 1/2007 | Watanabe | G01S 7/4004 |
| | | | 340/435 |
| 2007/0244641 A1* | 10/2007 | Altan | B60Q 9/008 |
| | | | 701/300 |
| 2008/0300783 A1* | 12/2008 | Miyajima | G01C 21/3652 |
| | | | 701/533 |
| 2012/0161951 A1* | 6/2012 | Ito | B60Q 9/008 |
| | | | 340/435 |
| 2014/0008948 A1* | 1/2014 | Rockwell | B60N 2/002 |
| | | | 297/217.3 |
| 2014/0152473 A1* | 6/2014 | Muhlenberg | G08G 1/166 |
| | | | 340/933 |
| 2014/0240114 A1* | 8/2014 | Waeller | B60Q 9/008 |
| | | | 340/435 |
| 2015/0353081 A1* | 12/2015 | Kaminade | G01S 13/931 |
| | | | 701/1 |
| 2017/0225618 A1 | 8/2017 | Tanaka | |
| 2017/0235135 A1 | 8/2017 | Ishiguro et al. | |
| 2018/0022277 A1* | 1/2018 | Tayama | B60N 2/90 |
| | | | 701/117 |
| 2018/0032824 A1* | 2/2018 | Yamamoto | B60R 1/00 |
| 2018/0170229 A1* | 6/2018 | Hashimoto | B60N 2/90 |
| 2020/0012097 A1* | 1/2020 | Kubota | G02B 27/01 |

FOREIGN PATENT DOCUMENTS

| | | |
|---|---|---|
| JP | 2008-56172 | 3/2008 |
| JP | 4329622 B2 | 9/2009 |
| JP | 2016-207097 | 12/2016 |
| JP | 2017-140952 | 8/2017 |
| JP | 2017-144889 | 8/2017 |
| KR | 10-0882687 B1 | 2/2009 |
| KR | 10-1793142 B1 | 11/2017 |
| KR | 10-2014-0080870 A | 7/2019 |
| RU | 2 514 924 C2 | 5/2014 |
| RU | 2 543 123 C2 | 2/2015 |

\* cited by examiner

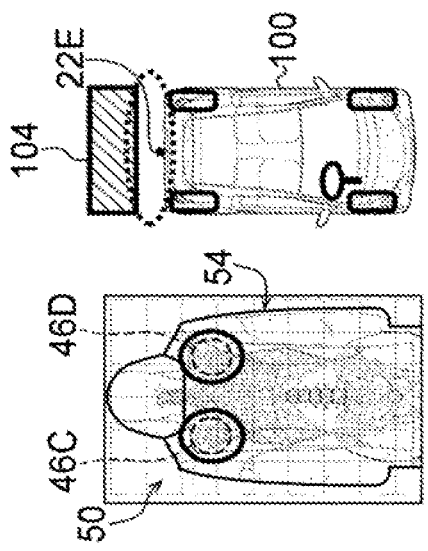 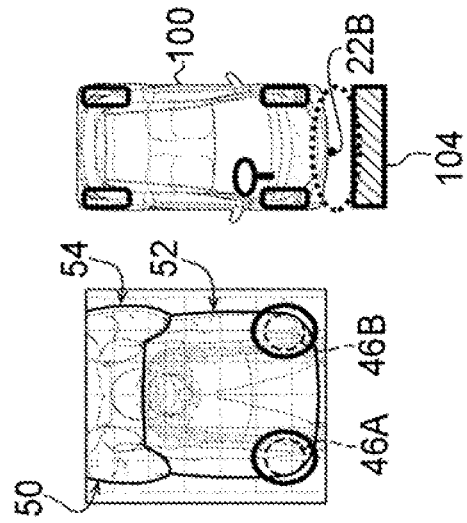
FIG. 8A  FIG. 8B  FIG. 8C
FIG. 8D  FIG. 8E  FIG. 8F
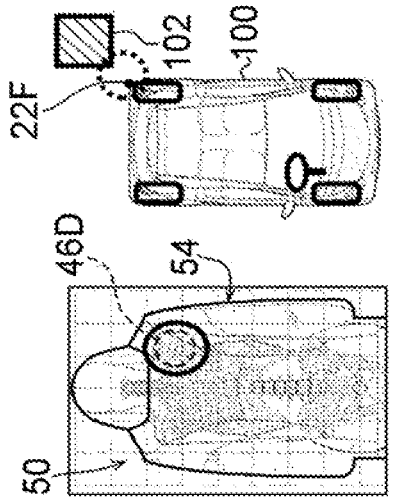 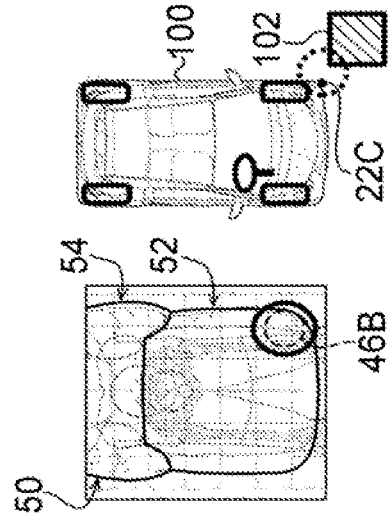
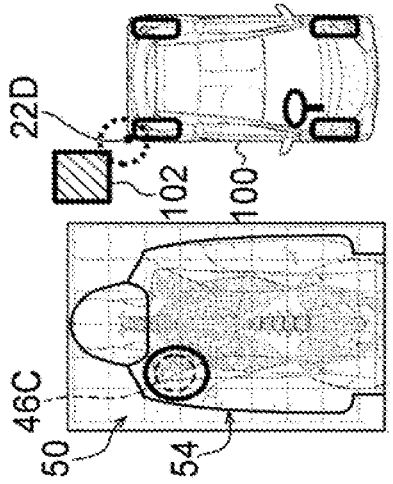 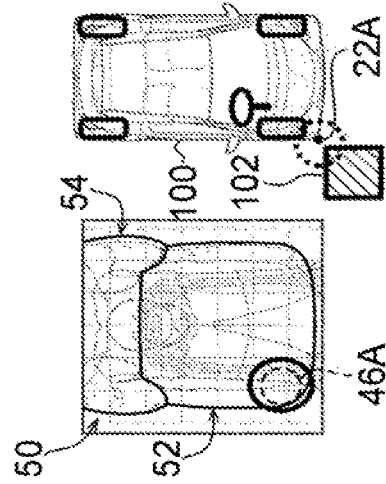

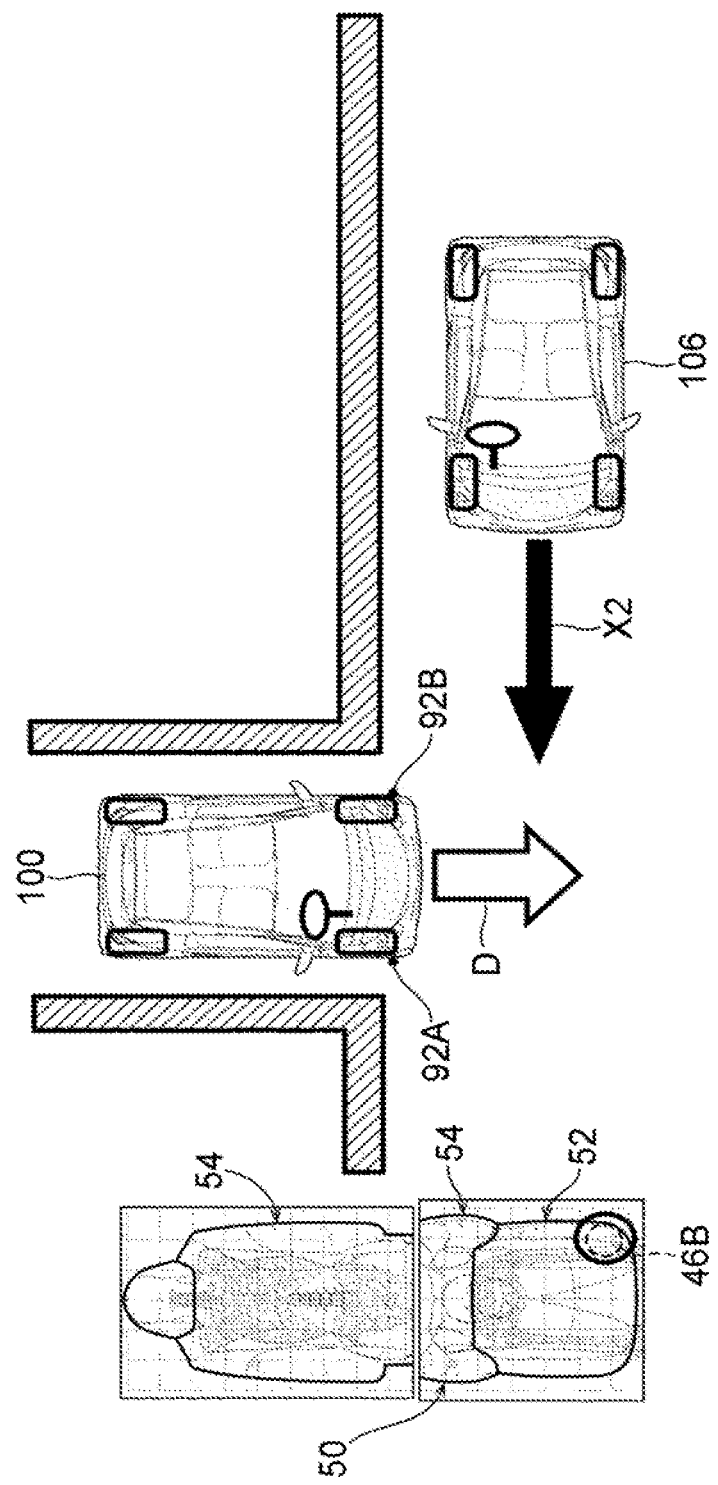

HAPTIC AND VISUAL ATTENTION ATTRACTING DEVICE FOR VEHICLE

INCORPORATION BY REFERENCE

The disclosure of Japanese Patent Application No. 2017-236138 filed on Dec. 8, 2017 including the specification, drawings and abstract is incorporated herein by reference in its entirety.

BACKGROUND

1. Technical Field

The present disclosure relates to an attention attracting device for a vehicle.

2. Description of Related Art

A technique for attracting attention of a vehicle occupant is known (see Japanese Patent Application Publication No. 2016-207097 (JP 2016-207097 A)). For example, the technique disclosed in JP 2016-207097 A relates to driving stimulus providing means, such as a vibrating motor attached to a seat of an own vehicle, when information on an object that may be an obstacle is detected around the own vehicle, and the information is transmitted to a driver. In JP 2016-207097 A, a technique is disclosed as a modification of the embodiment, the technique relating to driving one of the stimulus providing means attached to respective locations of the seat, depending on the direction to attract attention of the driver. According to such a technique, when only one type of attention information (for example, information on an obstacle around the own vehicle detected with ultrasonic waves) identical in perspective is transmitted, it is relatively easy for the driver to grasp the meaning of the attention attracting information.

SUMMARY

However, assume a case where a plurality of types of attention information different in perspective from each other (for example, information on an obstacle around the own vehicle detected using ultrasonic waves and information indicative of a lane departure or a lane departure possibility of the own vehicle) is transmitted to the driver in the prior art. In this case, even when a stimulus is provided in a given region of the seat, the driver may find it hard to understand or may fail to understand the content of the information that attracts attention.

The present disclosure provides an attention attracting device for a vehicle configured such that a plurality of types of attention information is transmitted to a sitting occupant with vibration of a vehicular seat, the attention attracting device enabling the sitting occupant to easily understand the meaning or the content of the attention attracting information through vibration.

An attention attracting device for a vehicle includes an electronic control unit configure to: detect a plurality of types of attention information around an own vehicle; apply vibration, by using a vibrator, to a vehicular seat; display, using a display, an attention information content corresponding to each of the plurality of types of attention information; operate the vibrator when the attention information is detected; and cause a display to display the attention information content corresponding to the detected attention information when the attention information is detected.

According to the above aspect, when the vehicular seat vibrates, the sitting occupant can easily understand, by viewing the display on the display unit, the meaning and the content of the information that attracts attention through vibration of the vehicular seat.

In the above aspect, a vibration pattern may be set in accordance with the content of the attention information, and the electronic control unit may configured to operate the vibrator with the vibration pattern corresponding to the content of the detected attention information.

In the above aspect, the electronic control unit may be configured to apply vibration to regions of the vehicular seat, the regions including a right front portion to be vibrated that is a region on a seat surface side and a right front-end side of a seat cushion in the vehicular seat, a left front portion to be vibrated that is a region on the seat surface side and a left front-end side of the seat cushion in the vehicular seat, a right rear portion to be vibrated that is a region on a backrest surface side and a right upper-end side of a seatback in the vehicular seat, and a left rear portion to be vibrated that is a region on the backrest surface side and a left upper-end side of the seatback in the vehicular seat, and the electronic control unit may be configured to: when the electronic control unit detects the attention information, and a detection position at which the electronic control unit detects the attention information for the own vehicle is at least one side of a right front side, a left front side, a right rear side, and a left rear side of the own vehicle, control an operation of the vibrator such that the vibrator applies vibration to a region on a side corresponding to the detection position as seen in a plan view of the vehicle, the region being among the right front portion to be vibrated, the left front portion to be vibrated, the right rear portion to be vibrated, and the left rear portion to be vibrated; when the detection position is right in front of the own vehicle, control the operation of the vibrator such that the vibrator applies vibration to both the right front portion to be vibrated and the left front portion to be vibrated; and when the detection position is right behind the own vehicle, control the operation of the vibrator such that the vibrator applies vibration to both the right rear portion to be vibrated and the left rear portion to be vibrated.

According to the above aspect, with the vibration position on the vehicular seat, the sitting occupant can easily grasp the detection position of the attention information around the own vehicle as a physical feeling.

In the above aspect, the plurality of types of attention information may include at least one of information on an obstacle around the own vehicle detected using ultrasonic waves, and information indicating a lane departure or a lane departure possibility of the own vehicle.

According to the above aspect, the plurality of types of attention information detected by the information detection unit includes high-priority attention information to which the sitting occupant needs to pay special attention. Therefore, safety can be enhanced.

As described in the foregoing, the present disclosure can provide, in the configuration of transmitting a plurality of types of attention information to a sitting occupant with vibration of a vehicular seat, an excellent effect of enabling the occupant to easily understand the meaning or the content of the attention attracting information transmitted through vibration of the vehicular seat.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8A is a schematic view illustrating one example of a relation between attention information detected with a clearance sonar detection mechanism and a vibration position;

FIG. 8B is a schematic view illustrating another example of the relation between attention information detected with the clearance sonar detection mechanism and a vibration position;

FIG. 8C is a schematic view illustrating another example of the relation between attention information detected with the clearance sonar detection mechanism and a vibration position;

FIG. 8D is a schematic view illustrating another example of the relation between attention information detected with the clearance sonar detection mechanism and a vibration position;

FIG. 8E is a schematic view illustrating another example of the relation between attention information detected with the clearance sonar detection mechanism and a vibration position;

FIG. 8F is a schematic view illustrating another example of the relation between attention information detected with the clearance sonar detection mechanism and a vibration position;

FIG. 17 is a schematic view illustrating a relation between attention information detected with an FCTA detection mechanism and a vibration position;

DETAILED DESCRIPTION OF EMBODIMENTS

First Embodiment

Figure 1:
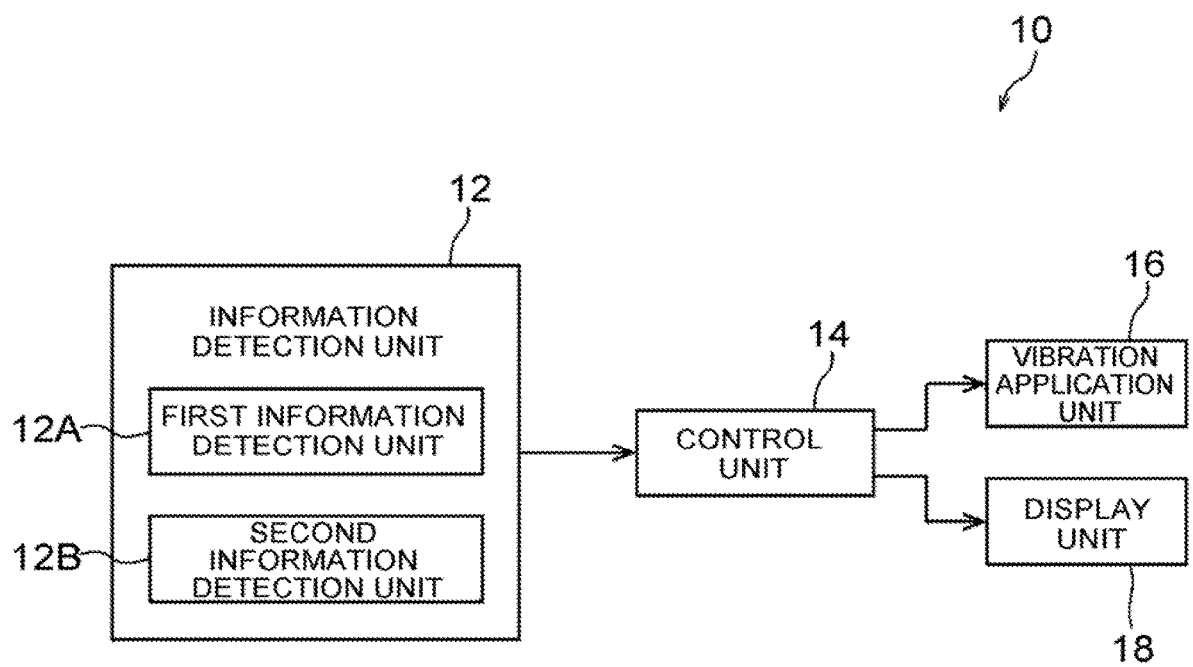
FIG. 1 is a functional block diagram illustrating a functional configuration of an attention attracting device for a vehicle according to a first embodiment.
Figure 2:
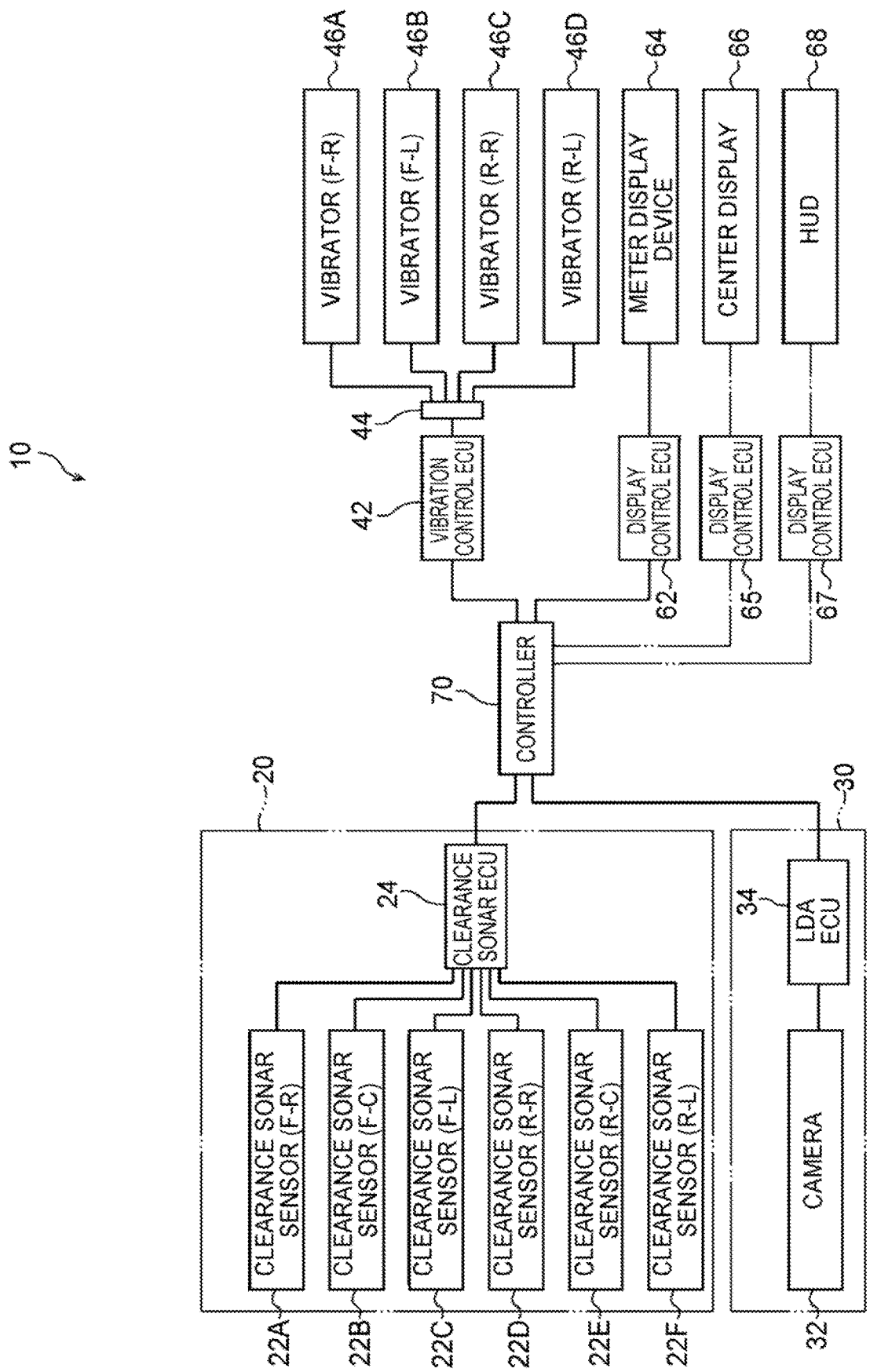
FIG. 2 is a block diagram illustrating one example of a schematic configuration of the attention attracting device for a vehicle according to the first embodiment.
Figure 3A:
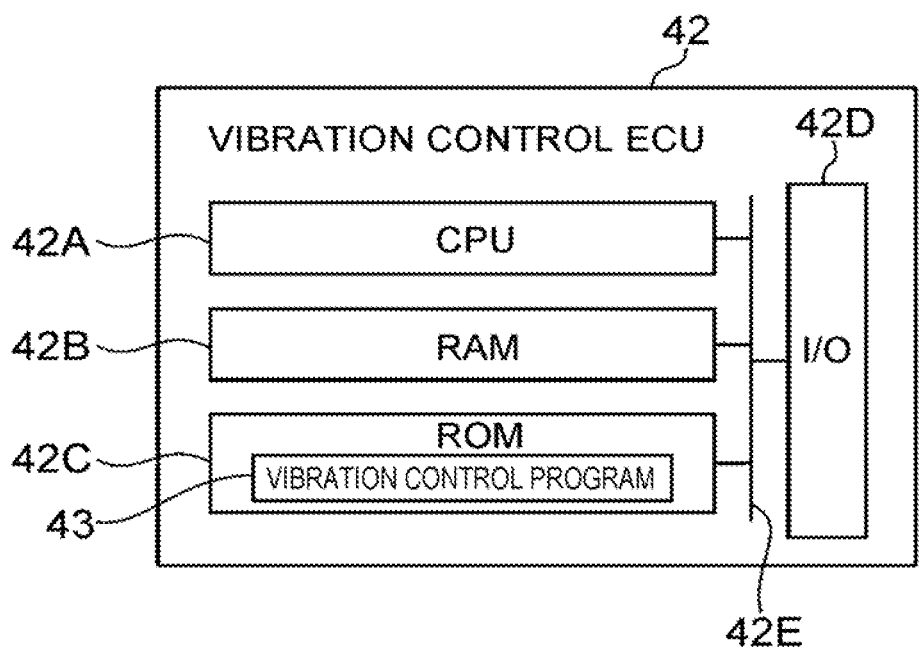
FIG. 3A is a block diagram illustrating a schematic configuration of a vibration control ECU.

An attention attracting device for a vehicle according to a first embodiment of the present disclosure will be described with reference to FIGS. 1 to 11B. FIG. 1 is a block diagram illustrating a functional configuration of an attention attracting device 10 for a vehicle according to the present embodiment, and FIG. 2 is a block diagram illustrating one example of a schematic configuration of the attention attracting device 10 for a vehicle. FIG. 4 is a schematic plan view illustrating one example of a vehicle 100 mounted with the attention attracting device 10 for a vehicle. In FIG. 4, an arrow FR represents a front side of the vehicle, and an arrow W represents a vehicle width direction.

The attention attracting device 10 for a vehicle illustrated in FIGS. 1 and 2 is a device mounted on a vehicle to provide various attention attracting information at the time of traveling of the vehicle. As illustrated in FIG. 1, the attention attracting device 10 for a vehicle is configured to include an information detection unit 12, a control unit 14, a vibration application unit 16, and a display unit 18.

The information detection unit 12 is a functional unit that detects a plurality of types of attention information around an own vehicle (vehicle mounted with the attention attracting device 10 for a vehicle in the present embodiment). The information detection unit 12 is configured to include a first information detection unit 12A and a second information detection unit 12B in the present embodiment. Here, the term "a plurality of types of attention information" may refer to a plurality of types of attention information different in perspective. The term "attention information" may refer to the information that preferably attracts attention of a sitting occupant, when the information is detected.

The first information detection unit 12A is a functional unit that detects attention information about an obstacle in the vicinity of a front bumper and a rear bumper when the own vehicle travels at low speeds (vehicle speeds of about 10 km/h or less in one example) with use of clearance sonar sensors 22A, 22B, 22C, 22D, 22E, 22F (hereinafter referred to as "clearance sonar sensors 22A to 22F" for short) and a clearance sonar ECU (hereinafter also referred to as "clearance sonar sensor ECU") 24 illustrated in FIG. 2. In the present embodiment, a component unit composed of the clearance sonar sensors 22A to 22F and the clearance sonar ECU 24 to function as the first information detection unit 12A (see FIG. 1) is referred to as a clearance sonar detection mechanism 20.

As illustrated in FIG. 4, the clearance sonar sensor 22A is attached to a right corner portion of the front bumper 26 of the vehicle 100. The clearance sonar sensor 22B is attached to a center portion of the front bumper 26 in a vehicle width direction. The clearance sonar sensor 22C is attached to a left corner portion of the front bumper 26. The clearance sonar sensor 22D is attached to a right corner portion of the rear bumper 28 of the vehicle 100. The clearance sonar sensor 22E is attached to a center portion of the rear bumper 28 in the vehicle width direction. The clearance sonar sensor 22F is attached to a left corner portion of the rear bumper 28. The clearance sonar sensors 22A to 22F are ultrasonic sensors that transmit ultrasonic waves to detect an obstacle. As illustrated in FIG. 2, the clearance sonar sensors 22A to 22F are connected to the clearance sonar ECU 24 to output a detection signal to the clearance sonar ECU 24. The clearance sonar ECU 24 includes a CPU, a RAM, a ROM, and an input-output interface unit (input-output). The ROM stores a determination control program. The clearance sonar ECU 24 determines the position of an obstacle and the distance to the obstacle based on the detection signal from the clearance sonar sensors 22A to 22F. The clearance sonar ECU 24 is also connected to a controller 70 through a control area network (CAN) to output a signal relating to the attention information to the controller 70.

The second information detection unit 12B illustrated in FIG. 1 is a functional unit that detects attention information about a lane departure with a camera 32 and a lane departure alert (LDA)-ECU 34 illustrated in FIG. 2. In the present embodiment, a component unit composed of the camera 32 and the LDA-ECU 34 to function as the second information detection unit 12B (see FIG. 1) is referred to as a lane departure alert detection mechanism 30. The lane departure alert detection mechanism 30 is hereinafter referred to as "LDA detection mechanism 30" for short.

As illustrated in FIG. 4, the camera 32 is a camera including an image sensor, such as a charge-coupled device (CCD), attached to a portion of a windshield glass 36 that is a center portion in the vehicle width direction and that is also an upper portion of the windshield glass 36. The camera 32 has an imaging region that is an oblique lower side in front of the own vehicle 100. In one example, the camera 32 is set to repeatedly take an image every several milliseconds. As illustrated in FIG. 2, the camera 32 is connected to the LDA-ECU 34 to output an image signal to the LDA-ECU 34. The LDA-ECU 34 includes a CPU, a RAM, a ROM, and an input-output interface unit (input-output). The ROM stores a determination control program. The LDA-ECU 34 recognizes a road dividing line in an image imaged with the camera 32, obtains a positional relationship between the own vehicle and a lane, and determines a lane departure or a lane departure possibility of the own vehicle. The LDA-ECU 34 is also connected to the controller 70 through the CAN to output a signal relating to attention information to the controller 70.

As described in the foregoing, in the present embodiment, a plurality of types of attention information detected by the information detection unit 12 illustrated in FIG. 1 includes both the attention information detected with the clearance sonar detection mechanism 20 illustrated in FIG. 2 (information on an obstacle around the own vehicle detected by using ultrasonic waves) and the attention information detected with the LDA detection mechanism 30 (information indicative of a lane departure or a lane departure possibility of the own vehicle).

As illustrated in FIG. 1, the information detection unit 12 is connected to the control unit 14. The control unit 14 will be described later. The control unit 14 is connected to the vibration application unit 16 and the display unit 18.

The vibration application unit 16 is a functional unit configured to include an amplifier 44 and vibrators 46A, 46B, 46C, 46D (hereinafter referred to as "vibrators 46A to 46D" for short) illustrated in FIG. 2 so as to allow application of vibration to a vehicular seat 50 (see FIGS. 4 and 5).

Figure 5:
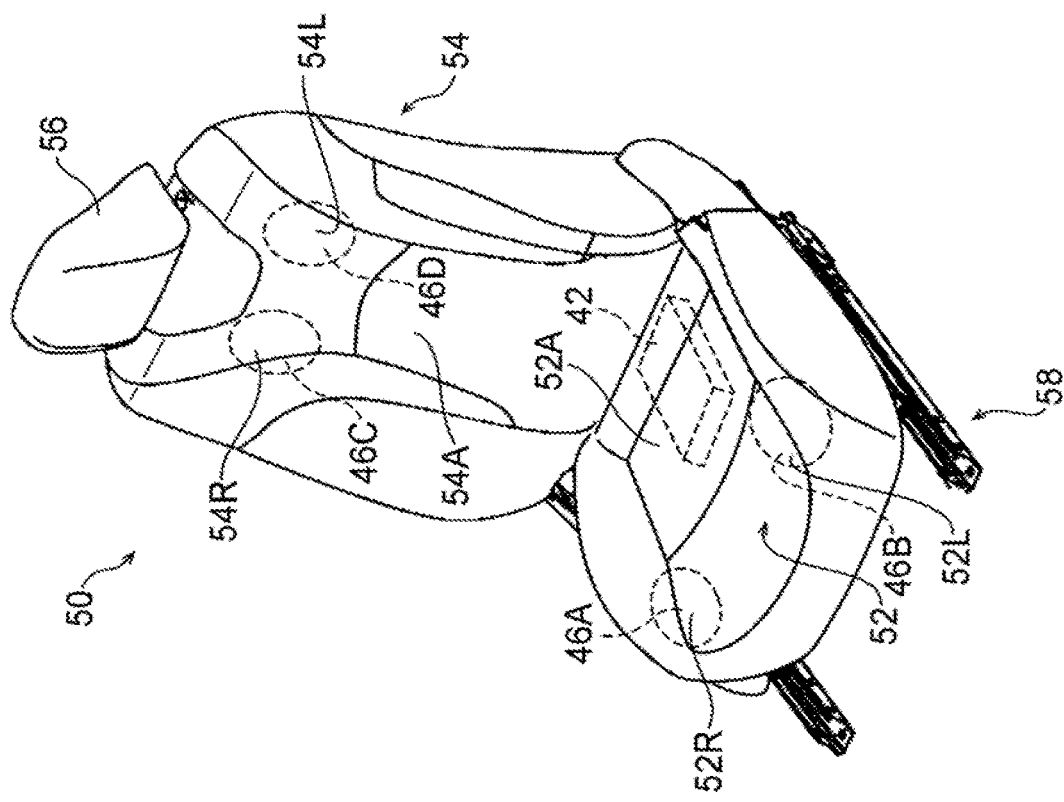
FIG. 5 is a schematic perspective view illustrating a vehicular seat of the vehicle mounted with the attention attracting device for a vehicle according to the first embodiment.
Figure 6:
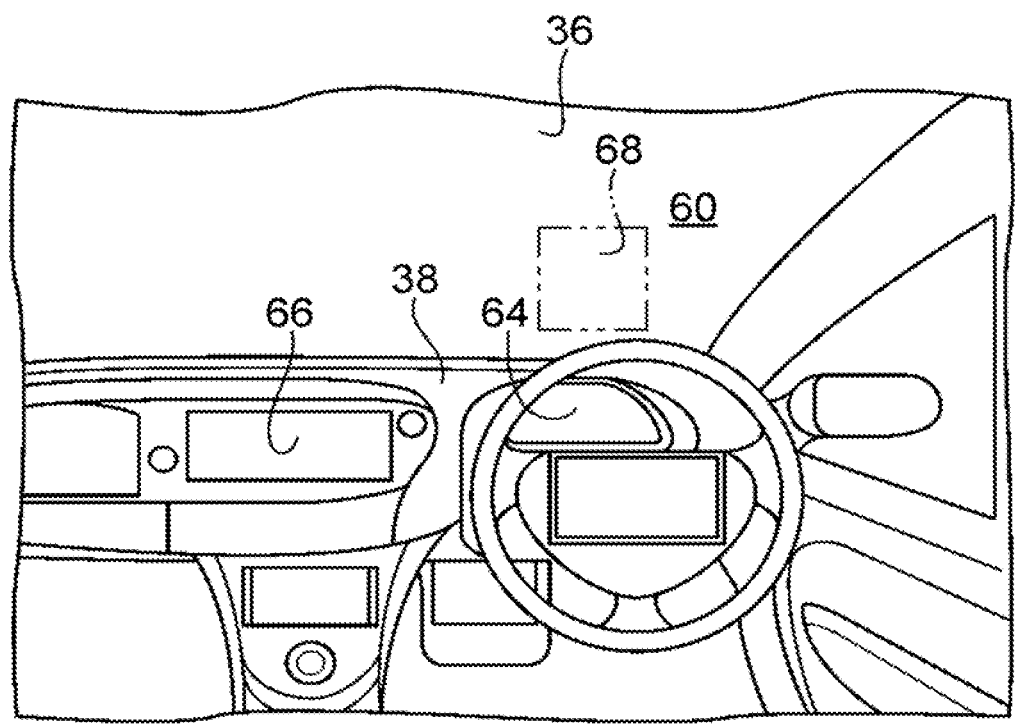
FIG. 6 is a schematic perspective view illustrating a cabin front of the vehicle mounted with the attention attracting device for a vehicle according to the first embodiment.

As illustrated in FIG. 5, the vehicular seat 50 includes a seat cushion 52 for supporting the buttock and the thigh of an occupant, and the upper surface of the seat cushion 52 is a seat surface 52A on which the occupant sits. The seat cushion 52 is slidable in a sheet front-rear direction with a sliding mechanism 58. On the upper side of a rear end portion of the seat cushion 52, a seatback 54 for supporting the back of the sitting occupant is placed to constitute a sheet rear portion. A front surface of the seatback 54 constitutes a backrest surface 54A. On the upper side of an upper end portion of the seatback 54, a headrest 56 is provided for supporting the head of the sitting occupant.

The vibrator 46A is placed inside the seat cushion 52 at a location that is a front end portion on a right side, and the vibrator 46B is placed inside the seat cushion 52 at a location that is a front end portion on a left side. The vibrators 46A, 46B are placed relatively close to the seat surface 52A in the seat cushion 52. The vibrator 46C is placed inside the seatback 54 at a location that is an upper end portion on the right side, and the vibrator 46D is placed inside the seatback 54 at a location that is an upper end portion on the left side. The vibrators 46C, 46D are placed relatively close to the backrest surface 54A in the seatback 54. In other words, the vibration application unit 16 (see FIG. 1) of the present embodiment can apply vibration to regions of the vehicular seat 50, including a pair of right and left front portions to be vibrated 52R, 52L which are right and left regions on the side of the seat surface 52A and also on the front end side of the seat cushion 52 in the vehicular seat 50, and a pair of right and left rear portions to be vibrated 54R, 54L which are right and left regions on the side of the backrest surface 54A and also on the upper end side of the seatback 54 in the vehicular seat 50. The vibrators 46A to 46D are configured to include motors in one example.

As illustrated in FIG. 2, the vibration control ECU 42 is connected to the vibrators 46A to 46D through the amplifier 44 to control vibration of the vibrators 46A to 46D. As illustrated in FIG. 3A, the vibration control ECU 42 includes a CPU 42A, a RAM 42B, a ROM 42C, and an input-output interface unit (input-output) 42D, which are connected with one another through a bus 42E. The ROM 42C is a nonvolatile storage unit, and a vibration control program 43 is stored in the ROM 42C. The input-output 42D communicates with component members such as the controller 70 (see FIG. 2) connected to the vibration control ECU 42. The vibration control ECU 42 controls vibration of the vibrators 46A to 46D illustrated in FIG. 2 when the vibration control program 43 is read from the ROM 42C and transmitted to the RAM 42B, and the vibration control program 43 transmitted to the RAM 42B is executed by the CPU 42A. The vibration control ECU 42 is connected to the controller 70 through the CAN to receive a signal relating to attention information from the controller 70.

The display unit 18 illustrated in FIG. 1 is a functional unit that can display the content of a plurality of types of attention information. In the present embodiment, the content of the attention information is displayed with a meter display device 64 illustrated in FIG. 6, for example. As a modification of the present embodiment, the display unit 18 (see FIG. 1) may be a functional unit that can display the content of a plurality of types of attention information with a center display 66 or a head-up display 68 (hereinafter referred to as "HUD 68") in place of the meter display device 64. The meter display device 64 and the center display 66 are placed in an instrument panel 38 of a cabin front 60. The HUD 68 has a body portion incorporated in the instrument panel 38 of the own vehicle and performs projection display onto a windshield glass 36. Since the basic configuration of the HUD 68 is publicly known, as disclosed in Japanese Patent Application Publication No. 2017-144889 for example, the detailed description thereof is omitted.

As illustrated in FIG. 2, the meter display device 64 is connected to the controller 70 through a display control ECU 62. As a modification of the present embodiment, the center displays 66 may be configured to be connected to the controller 70 through a display control ECU 65, and the HUD 68 may be configured to be connected to the controller 70 through a display control ECU 67. The display control ECU 65 and the display control ECU 67 are component units substantially identical to the display control ECU 62.

Figure 3B:
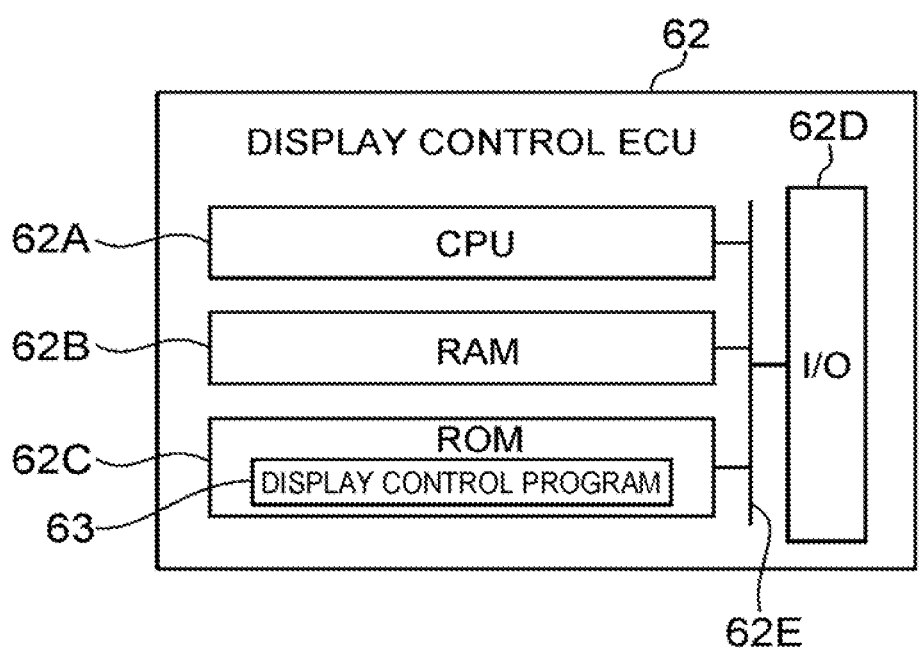
FIG. 3B is a block diagram illustrating a schematic configuration of a display control ECU.
Figure 4:
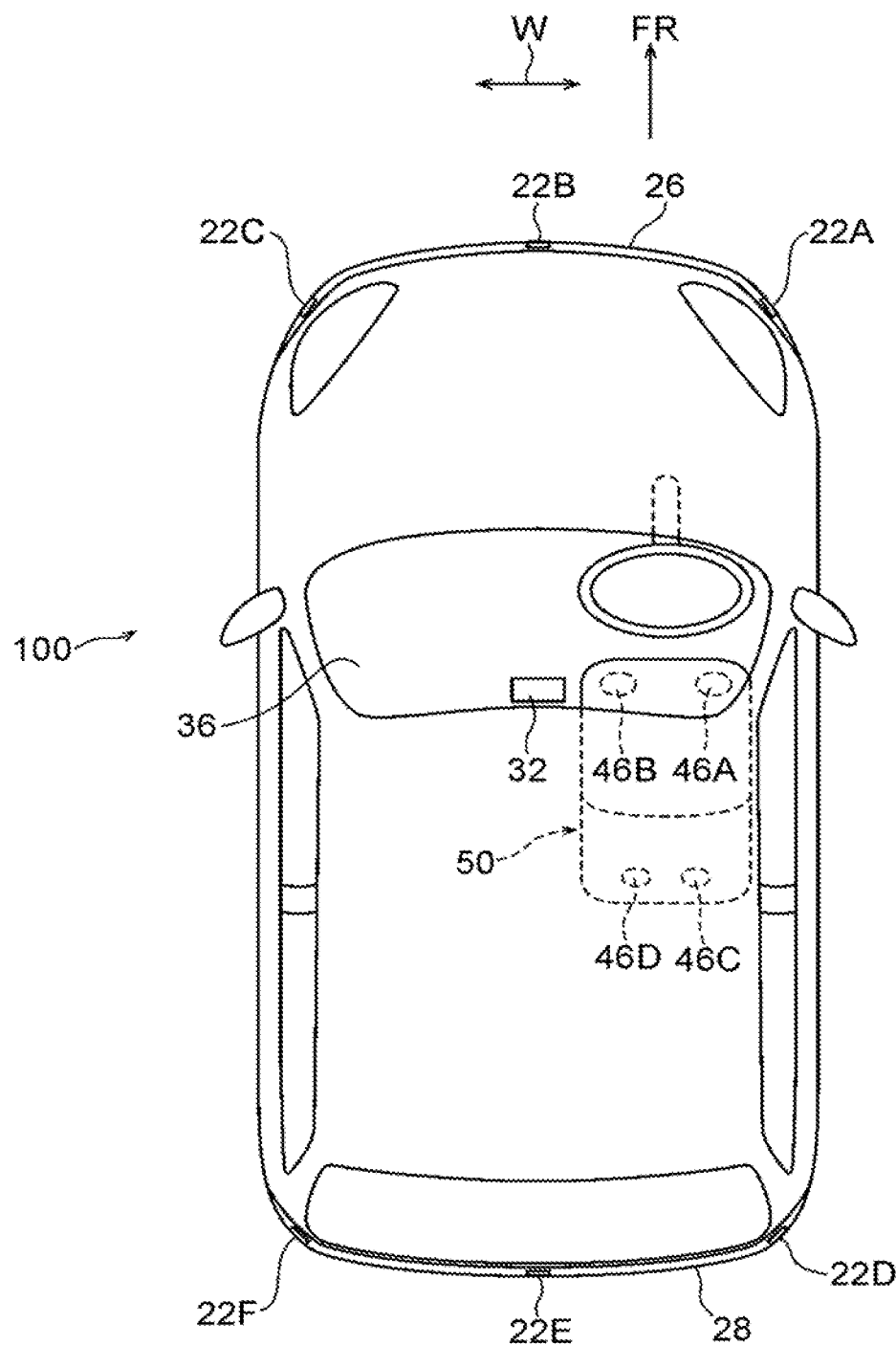
FIG. 4 is a schematic plan view illustrating one example of a vehicle mounted with the attention attracting device for a vehicle according to the first embodiment.

As illustrated in FIG. 3B, the display control ECU 62 includes a CPU 62A, a RAM 62B, a ROM 62C, and an input-output interface unit (input-output) 62D, which are connected with one another through a bus 62E. The ROM 62C is a nonvolatile storage unit, and a display control program 63 is stored in the ROM 62C. The input-output 62D communicates with component members such as the controller 70 (see FIG. 2) connected to the display control ECU 62. The display control ECU 62 controls display of the meter display device 64 illustrated in FIG. 2 when the display control program 63 is read from the ROM 62C and expanded in the RAM 62B, and the display control program 63 expanded in the RAM 62B is executed by the CPU 62A. The display control ECU 62 is connected to the controller 70 through the CAN to receive a signal relating to attention information from the controller 70.

The control unit 14 illustrated in FIG. 1 is a functional unit including the controller 70, the vibration control ECU 42, and the display control ECU 62 illustrated in FIG. 2. When the information detection unit 12 illustrated in FIG. 1 detects attention information, the control unit 14 operates the vibration application unit 16 with the controller 70, the vibration control ECU 42, and the display control ECU 62, and displays on the display unit 18 the content corresponding to the detected attention information. Here, a more detailed description is given of the control on the operation of the vibration application unit 16 by the control unit 14 when the information detection unit 12 detects attention information. When the information detection unit 12 detects attention information, and a detection position of the attention information for the own vehicle is any one of a right front side, a left front side, a right rear side, and a left rear side of the own vehicle, the control unit 14 controls operation of the vibration application unit 16 illustrated in FIG. 1 such that the vibration application unit 16 applies vibration to a region on the side corresponding to any one sides of the right and left front portions to be vibrated 52R, 52L, and the right and left rear portions to be vibrated 54R and 54L as seen in a plan view of the vehicle. When the information detection unit 12 detects attention information, and a detection position of the attention information for the own vehicle is right in front of the own vehicle, the control unit 14 controls operation of the vibration application unit 16 such that the vibration application unit 16 applies vibration to both the right and left front portions to be vibrated 52R, 52L (see FIG. 5). When the information detection unit 12 detects attention information, and a detection position of the attention information for the own vehicle is right behind the own vehicle, the control unit 14 controls operation of the vibration application unit 16 such that the vibration application unit 16 applies vibration to both the right and left rear portions to be vibrated 54R, 54L (see FIG. 5).

Figure 9B:
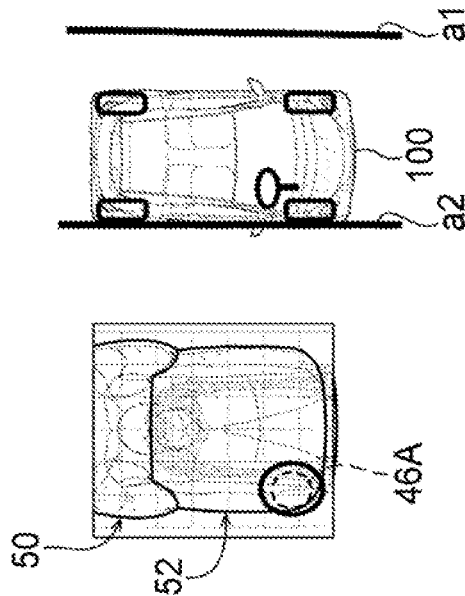
FIG. 9B is a schematic view illustrating a relation between attention information detected with the LDA detection mechanism and a vibration position.
Figure 9A:
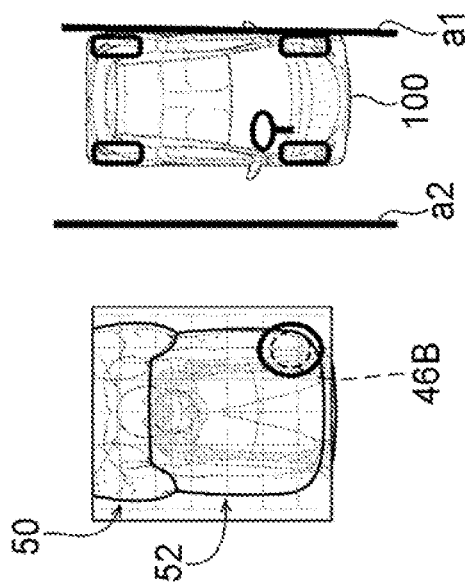
FIG. 9A is a schematic view illustrating a relation between attention information detected with an LDA detection mechanism and a vibration position.

Here, a relation between the attention information around the own vehicle and application of vibration to the vehicular seat 50 (see FIGS. 4 and 5) is described in detail with reference to FIGS. 8A to 8F, 9A and 9B. FIGS. 8A to 8F illustrate a relation between the attention information detected with the clearance sonar detection mechanism 20 (see FIG. 2) and vibration positions. FIGS. 9A and 9B illustrate a relation between the attention information detected with the LDA detection mechanism 30 (see FIG. 2) and the vibration positions. In each of FIGS. 8A to 8F, 9A and 9B, the own vehicle and the surrounding condition of the own vehicle are illustrated on the right-hand side, and the vibration position of the vehicular seat 50 is illustrated on the left-hand side of the drawings. In each of the drawings, a portion generally corresponding to the region to be vibrated in the vehicular seat 50 is surrounded with a thick circle for easy understanding.

As illustrated in FIG. 8A, when the clearance sonar sensor 22D detects an obstacle 102 on the right rear side of the own vehicle 100, the vibration control ECU 42 (see FIG. 2, hereinafter description of reference drawings may properly be omitted) vibrates the vibrator 46C on the right rear side of the vehicular seat 50. As illustrated in FIG. 8B, when the clearance sonar sensor 22F detects the obstacle 102 on the left rear side of the own vehicle 100, the vibration control ECU 42 vibrates the vibrator 46D on the left rear side of the vehicular seat 50. As illustrated in FIG. 8C, when the clearance sonar sensor 22E detects the obstacle 104 right behind the own vehicle 100, the vibration control ECU 42 vibrates the vibrator 46C on the right rear side of the vehicular seat 50, and the vibrator 46D on the left rear side of the vehicular seat 50.

As illustrated in FIG. 8D, when the clearance sonar sensor 22A detects the obstacle 102 on the right front side of the own vehicle 100, the vibration control ECU 42 vibrates the vibrator 46A on the right front side of the vehicular seat 50. As illustrated in FIG. 8E, when the clearance sonar sensor 22C detects the obstacle 102 on the left front side of the own vehicle 100, the vibration control ECU 42 vibrates the vibrator 46B on the left front side of the vehicular seat 50. As illustrated in FIG. 8F, when the clearance sonar sensor 22B detects the obstacle 104 right in front of the own vehicle 100, the vibration control ECU 42 vibrates the vibrator 46A on the right front side of the vehicular seat 50, and the vibrator 46B on the left front side of the vehicular seat 50.

As illustrated in FIG. 9A, when a lane departure or a high possibility of the lane departure of the own vehicle 100 to the left is determined, the vibration control ECU 42 vibrates the vibrator 46B on the left front side of the vehicular seat 50. To be more specific, when the own vehicle 100 that is traveling forward departs from a travel lane to the left, the lane departure of the own vehicle 100 starts from the left front side of the own vehicle 100. Therefore, the left front side of the vehicular seat 50 is vibrated accordingly. That is, the left front side of the vehicular seat 50 is vibrated to enable a sitting occupant to easily understand the content of the attention information. As illustrated in FIG. 9B, when a lane departure or a high possibility of the lane departure of the own vehicle 100 to the right is determined, the vibration control ECU 42 vibrates the vibrator 46A on the right front side of the vehicular seat 50. To be more specific, when the own vehicle 100 that is traveling forward departs from the travel lane to the right, the lane departure of the own vehicle 100 starts from the right front side of the own vehicle 100. Therefore, the right front side of the vehicular seat 50 is vibrated accordingly. That is, the right front side of the vehicular seat 50 is vibrated to enable a sitting occupant to easily understand the content of the attention information. In FIGS. 9A and 9B, lines a1, a2 represent the lines (dividing lines) that define the lane.

Figure 10C:
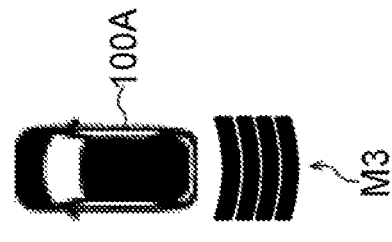
FIG. 10C illustrates another display example in the case of detecting attention information with the clearance sonar detection mechanism.
Figure 10F:
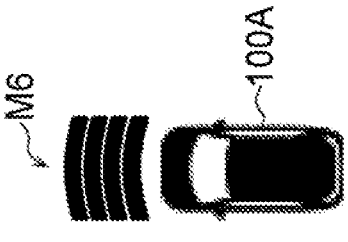
FIG. 10F illustrates another display example in the case of detecting attention information with the clearance sonar detection mechanism.
Figure 10B:
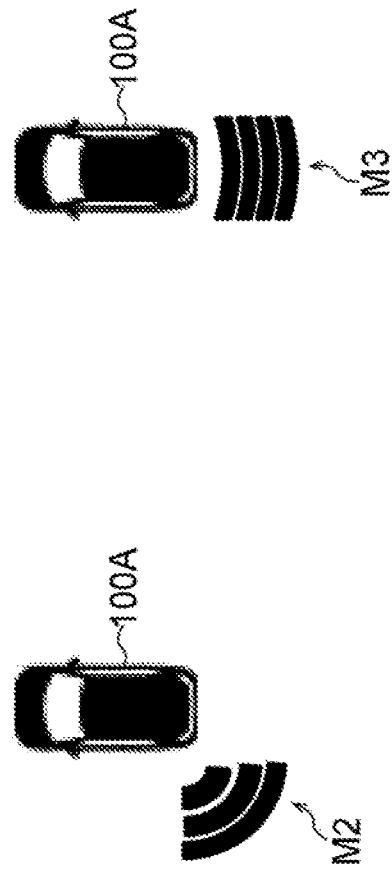
FIG. 10B illustrates another display example in the case of detecting attention information with the clearance sonar detection mechanism.
Figure 10E:
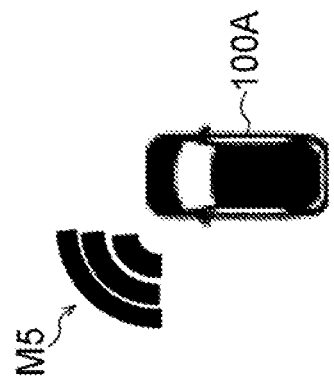
FIG. 10E illustrates another display example in the case of detecting attention information with the clearance sonar detection mechanism.
Figure 10A:
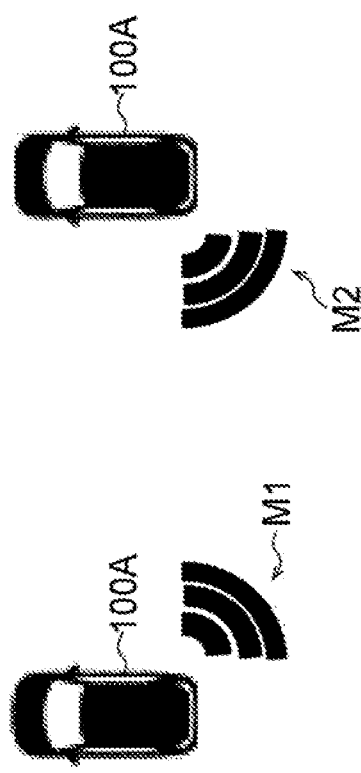
FIG. 10A illustrates a display example in the case of detecting attention information with the clearance sonar detection mechanism.
Figure 10D:
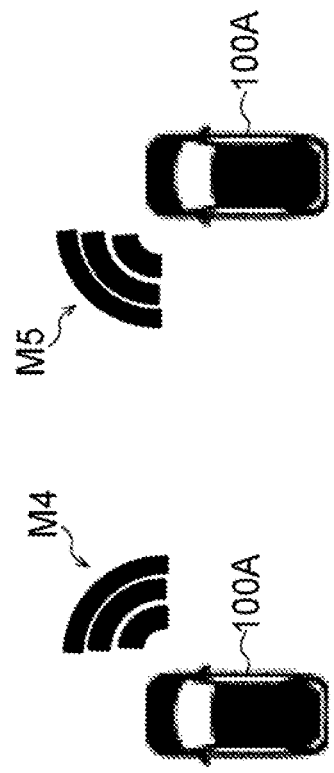
FIG. 10D illustrates another display example in the case of detecting attention information with the clearance sonar detection mechanism.
Figure 11B:
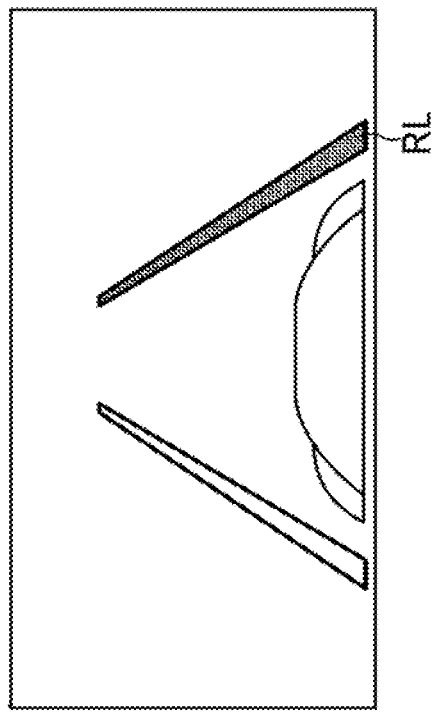
FIG. 11B illustrates another display example in the case of detecting attention information with the LDA detection mechanism.
Figure 11A:
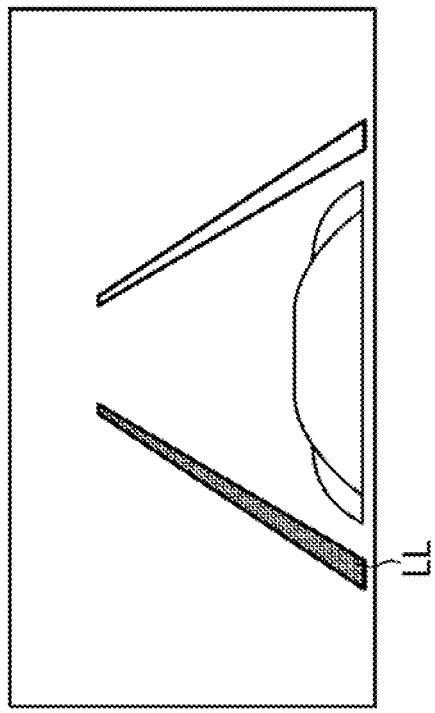
FIG. 11A illustrates a display example in the case of detecting attention information with the LDA detection mechanism.

A description is now given of display examples of the attention information displayed on the meter display device 64 (see FIG. 6) with reference to FIGS. 10A to 10F, 11A and 11B. FIGS. 10A to 10F illustrate display examples in the case of detecting attention information with the clearance sonar detection mechanism 20 (see FIG. 2). FIGS. 11A and 11B illustrate display examples in the case of detecting attention information with the LDA detection mechanism 30 (see FIG. 2).

FIG. 10A is a display example when an obstacle is detected on the right rear side of the own vehicle. In this case, a mark M1 representing the presence of an obstacle is displayed on the right rear side of a mark 100A of the own vehicle. FIG. 10B is a display example when an obstacle is detected on the left rear side of the own vehicle. In this case, a mark M2 representing the presence of an obstacle is displayed on the left rear side of the mark 100A of the own vehicle. FIG. 10C is a display example when an obstacle is detected right behind the own vehicle. In this case, a mark M3 representing the presence of an obstacle is displayed right behind the mark 100A of the own vehicle.

FIG. 10D is a display example when an obstacle is detected on the right front side of the own vehicle. In this case, a mark M4 representing the presence of an obstacle is displayed on the right front side of the mark 100A of the own vehicle. FIG. 10E is a display example when an obstacle is detected on the left front side of the own vehicle. In this case, a mark M5 representing the presence of an obstacle is displayed on the left front side of the mark 100A of the own vehicle. FIG. 10F is a display example when an obstacle is detected right in front of the own vehicle. In this case, a mark M6 representing the presence of an obstacle is displayed right in front of the mark 100A of the own vehicle.

More specifically, when attention information is detected with the clearance sonar detection mechanism 20 (see FIG. 2), the marks M1 to M6 that represent the presence of an obstacle are displayed around the mark 100A of the own vehicle in accordance with the position of the detected obstacle.

FIG. 11A is a display example in the case of a lane departure or a high possibility of the lane departure of the own vehicle to the left. In this case, a left-side line LL of a travel lane is emphasized. FIG. 11B is a display example in the case of a lane departure or a high possibility of the lane departure of the own vehicle to the right. In this case, a right-side line RL is emphasized. In short, the meter display device 64 (see FIG. 6) emphasizes the line from which the own vehicle departs or possibly departs.

Figure 7A:
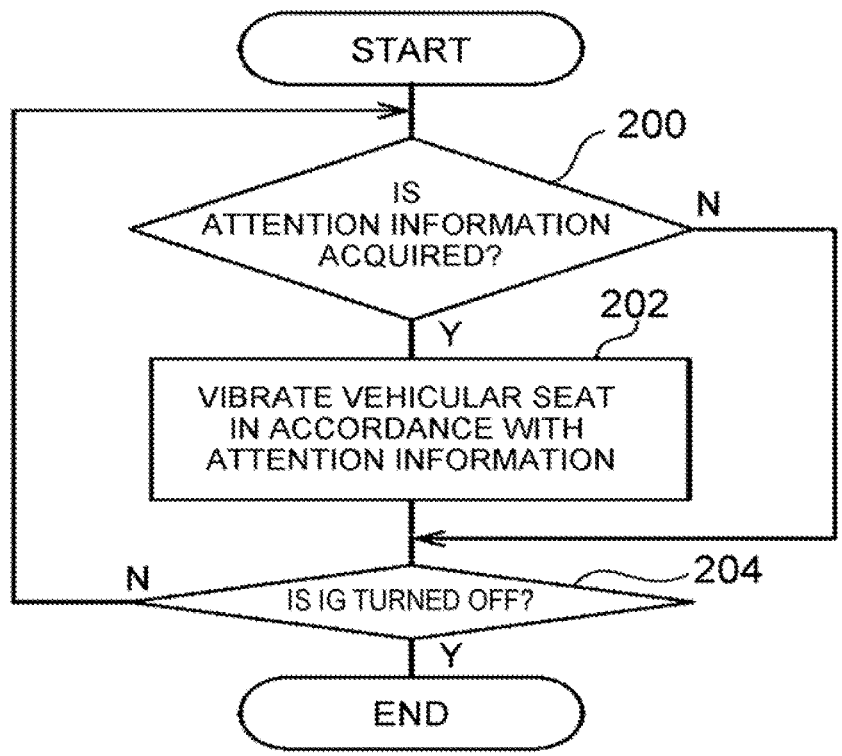
FIG. 7A is a flowchart illustrating one example of a process flow executed by the vibration control ECU.

A description is now given of the vibration control process executed by the vibration control ECU 42 in the vehicle mounted with the attention attracting device 10 for a vehicle illustrated in FIG. 2, with reference to a flowchart illustrated in FIG. 7A. In the present embodiment, when an ignition switch is turned on and a signal indicating the ignition switch is turned on is input into the vibration control ECU 42, execution of the display control process illustrated in FIG. 7A is started in one example.

In step 200 of the vibration control process illustrated in FIG. 7A, the vibration control ECU 42 determines whether or not attention information is acquired, in other words, whether or not a detection signal of attention information is input from the controller 70. When positive determination is made in step 200, the process shifts to step 202. When negative determination is made in step 200, the process shifts to step 204.

In step 202, the vibration control ECU 42 controls the vibrators 46A to 46D to vibrate the vehicular seat 50 in accordance with the acquired attention information. The relation between the attention information and the vibration regions is as described before (see FIGS. 8A to 8F, 9A and 9B).

In subsequent step 204, the vibration control ECU 42 determines whether or not the ignition switch (IG) of the own vehicle is turned off. When negative determination is made in step 204, the process returns to step 200, and steps 200 to 204 are repeated until positive determination is made in step 204. When positive determination is made in step 204, the vibration control ECU 42 ends the vibration control process illustrated in FIG. 7A.

Next, the display control process executed by the display control ECU 62 in the vehicle mounted with the attention attracting device 10 for a vehicle illustrated in FIG. 2 will be described with reference to a flowchart illustrated in FIG. 7B. In the present embodiment, when the ignition switch is turned on and a signal indicating that the ignition switch is turned on is input into the display control ECU 62, execution of the display control process illustrated in FIG. 7B is started in one example.

Figure 7B:
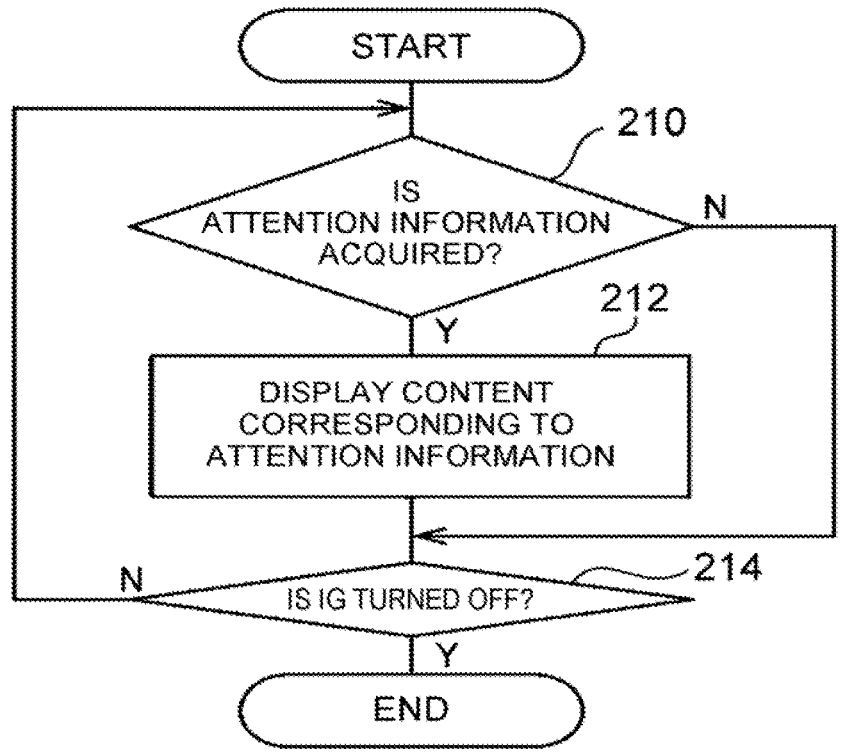
FIG. 7B is a flowchart illustrating one example of a process flow executed by the display control ECU.

In step 210 of the display control process illustrated in FIG. 7B, the display control ECU 62 determines whether or not attention information is acquired, in other words, whether or not a detection signal of attention information is input from the controller 70. When positive determination is made in step 210, the process shifts to step 212. When negative determination is made in step 210, the process shifts to step 214.

In step 212, the display control ECU 62 controls operation of the meter display device 64 such that the meter display device 64 displays the content corresponding to the acquired attention information. The relation between the attention information and the display examples is as described before (see FIGS. 10A to 10F, 11A and 11B).

In subsequent step 214, the display control ECU 62 determines whether or not the ignition switch (IG) of the own vehicle is turned off. When negative determination is made in step 214, the process returns to step 210, and steps 210 to 214 are repeated until positive determination is made in step 214. When positive determination is made in step 214, the display control ECU 62 ends the display control process illustrated in FIG. 7B.

Next, functions and effects of the present embodiment will be described.

First, when the clearance sonar detection mechanism 20 illustrated in FIG. 2 detects attention information in any one region in the vicinity of the front bumper and the rear bumper, the detected attention information is transmitted to the vibration control ECU 42 and the display control ECU 62 via the controller 70. The vibration control ECU 42 controls operation of the vibrators 46A to 46D so as to vibrate a region corresponding to the detection position of the attention information as illustrated in FIGS. 8A to 8F. The display control ECU 62 illustrated in FIG. 2 displays the content corresponding to the attention information (one of FIGS. 10A to 10F) on a display screen of the meter display device 64.

When the LDA detection mechanism 30 illustrated in FIG. 2 detects attention information about a lane departure, the attention information is transmitted to the vibration control ECU 42 and the display control ECU 62 via the controller 70. The vibration control ECU 42 controls operation of the vibrators 46A to 46D so as to vibrate a region corresponding to the detection position of the attention information as illustrated in FIGS. 9A and 9B. The display control ECU 62 illustrated in FIG. 2 displays the content corresponding to the attention information (one of FIGS. 11A and 11B) on the screen of the meter display device 64.

As described in the foregoing, in the present embodiment, a plurality of types of attention information can be transmitted through vibration of the vehicular seat 50 (see FIG. 5), and a sitting occupant can easily understand, by viewing the screen of the meter display device 64, the meaning and the content of the attention attracting information transmitted through vibration of the vehicular seat 50.

In the present embodiment, in the vehicular seat 50 illustrated in FIG. 5, the vibrators 46A to 46D (vibration application unit 16 (see FIG. 1)) can apply vibration to the regions including the right and left front portions to be vibrated 52R, 52L and the right and left rear portions to be vibrated 54R, 54L. The right and left front portions to be vibrated 52R, 52L and the right and left rear portions to be vibrated 54R, 54L are provided in both the ends of the vehicular seat 50 in the sheet front-rear direction as seen in a vehicle plan view. When the information detection unit 12 detects attention information, and the detection position of the attention information for the own vehicle is any one side of a right front side, a left front side, a right rear side, and a left rear side, the control unit 14 illustrated in FIG. 1 controls operation of the vibration application unit 16 such that the vibration application unit 16 illustrated in FIG. 1 applies vibration to a region on the side corresponding to any one sides of the right and left front portions to be vibrated 52R, 52L, and the right and left rear portions to be vibrated 54R, 54L as seen in a plan view of the vehicle. When the information detection unit 12 detects attention information, and the detection position of the attention information for the own vehicle is right in front of the own vehicle, the control unit 14 controls operation of the vibration application unit 16 such that the vibration application unit 16 applies vibration to both the right and left front portions to be vibrated 52R, 52L (see FIG. 5). When the detection position of the attention information for the own vehicle is right behind the own vehicle, the control unit 14 controls operation of the vibration application unit 16 such that the vibration application unit 16 applies vibration to both the right and left rear portions to be vibrated 54R, 54L (see FIG. 5). Therefore, with the vibration position on the vehicular seat 50, the sitting occupant can easily grasp the detection position of the attention information around the own vehicle as a physical feeling.

In the present embodiment, the attention attracting device 10 for a vehicle provides attention information that attracts attention, including the attention information detected with the clearance sonar detection mechanism 20 illustrated in FIG. 2 (information on an obstacle around the own vehicle detected by using ultrasonic waves) and the attention information detected with the LDA detection mechanism 30 (information indicative of a lane departure or a lane departure possibility of the own vehicle). In other words, the attention information includes high-priority attention information to which the sitting occupant needs to pay special attention. Therefore, safety can be enhanced.

Second Embodiment

Figure 12:
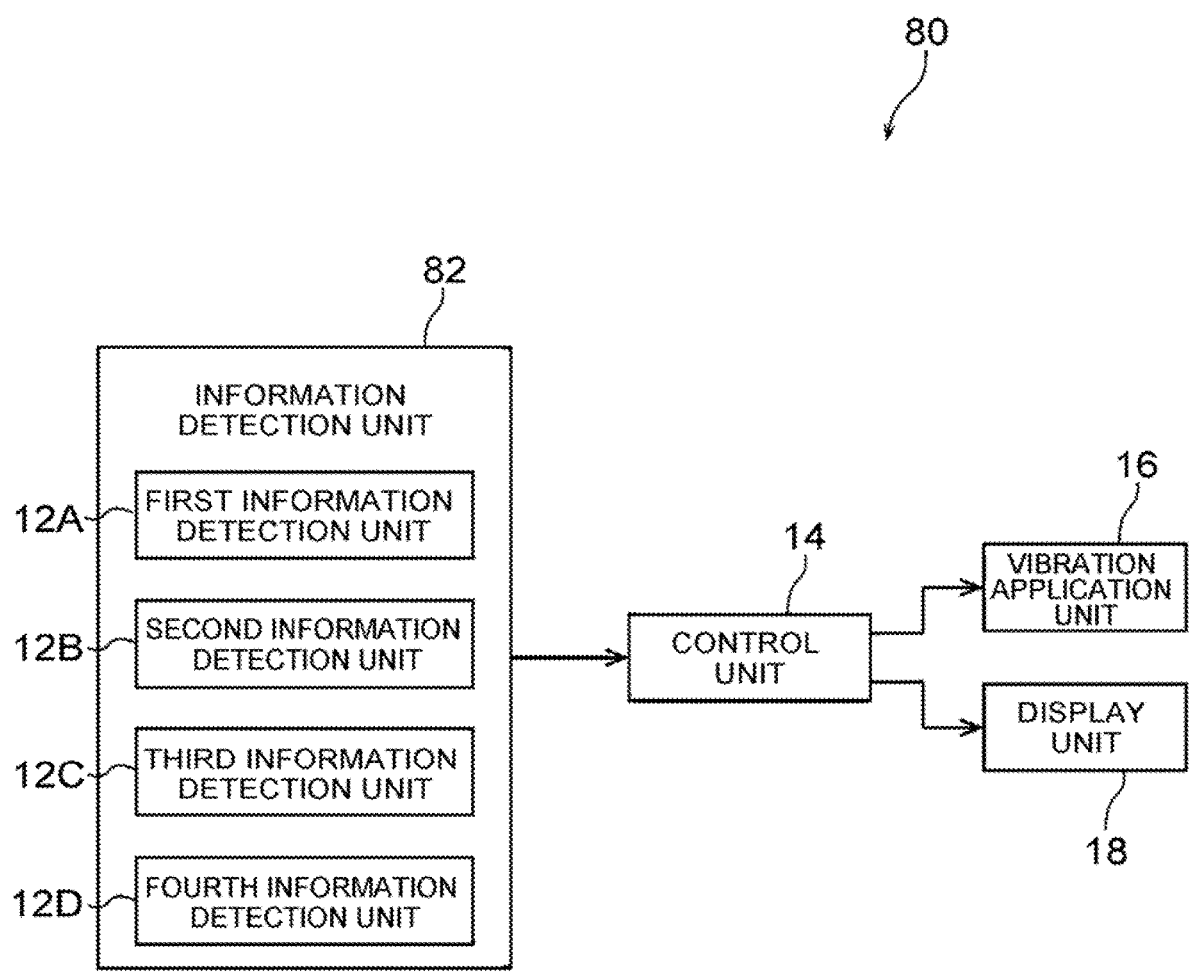
FIG. 12 is a functional block diagram illustrating a functional configuration of an attention attracting device for a vehicle according to a second embodiment.
Figure 13:
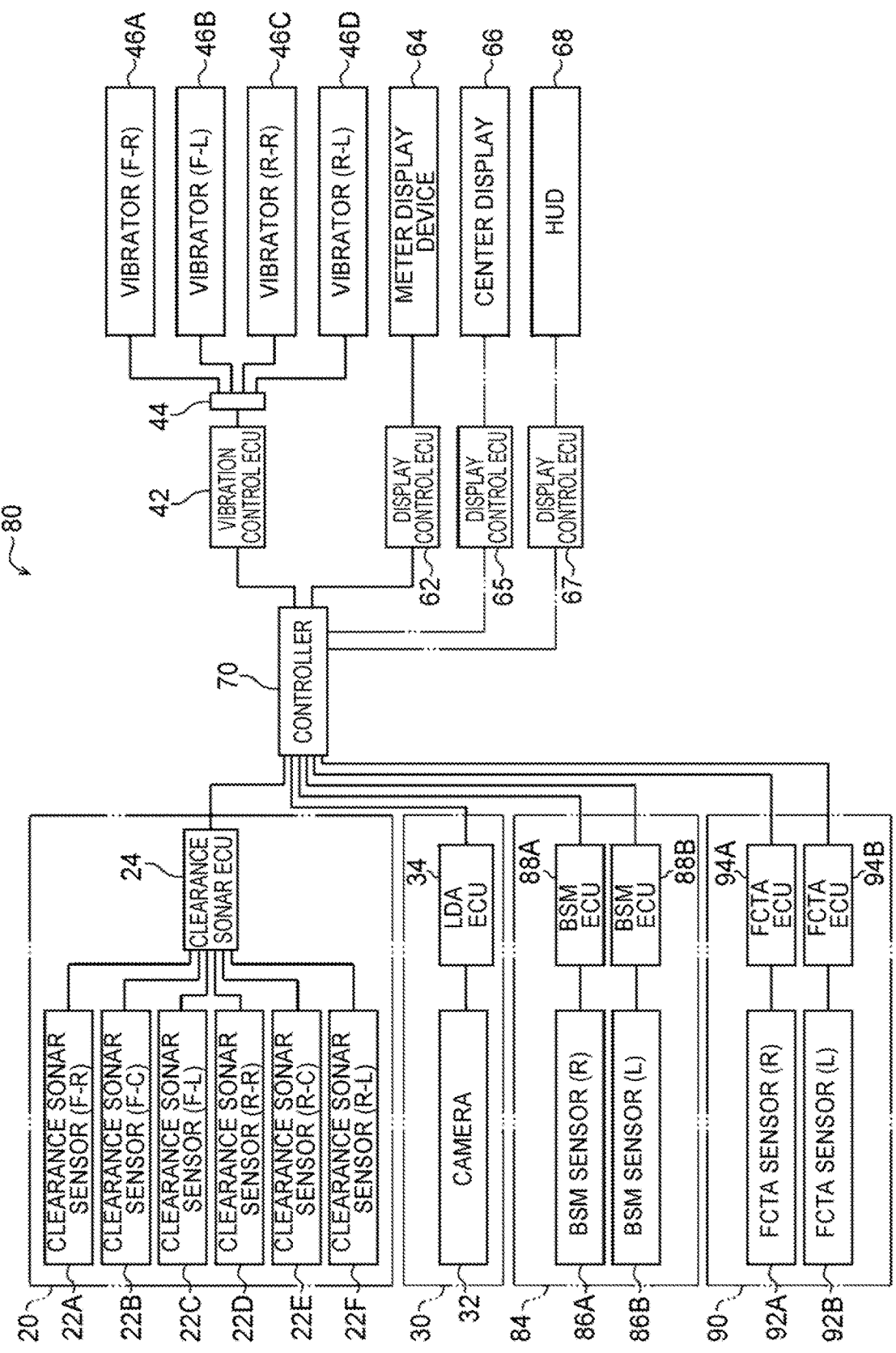
FIG. 13 is a block diagram illustrating one example of a schematic configuration of the attention attracting device for a vehicle according to the second embodiment.
Figure 14:
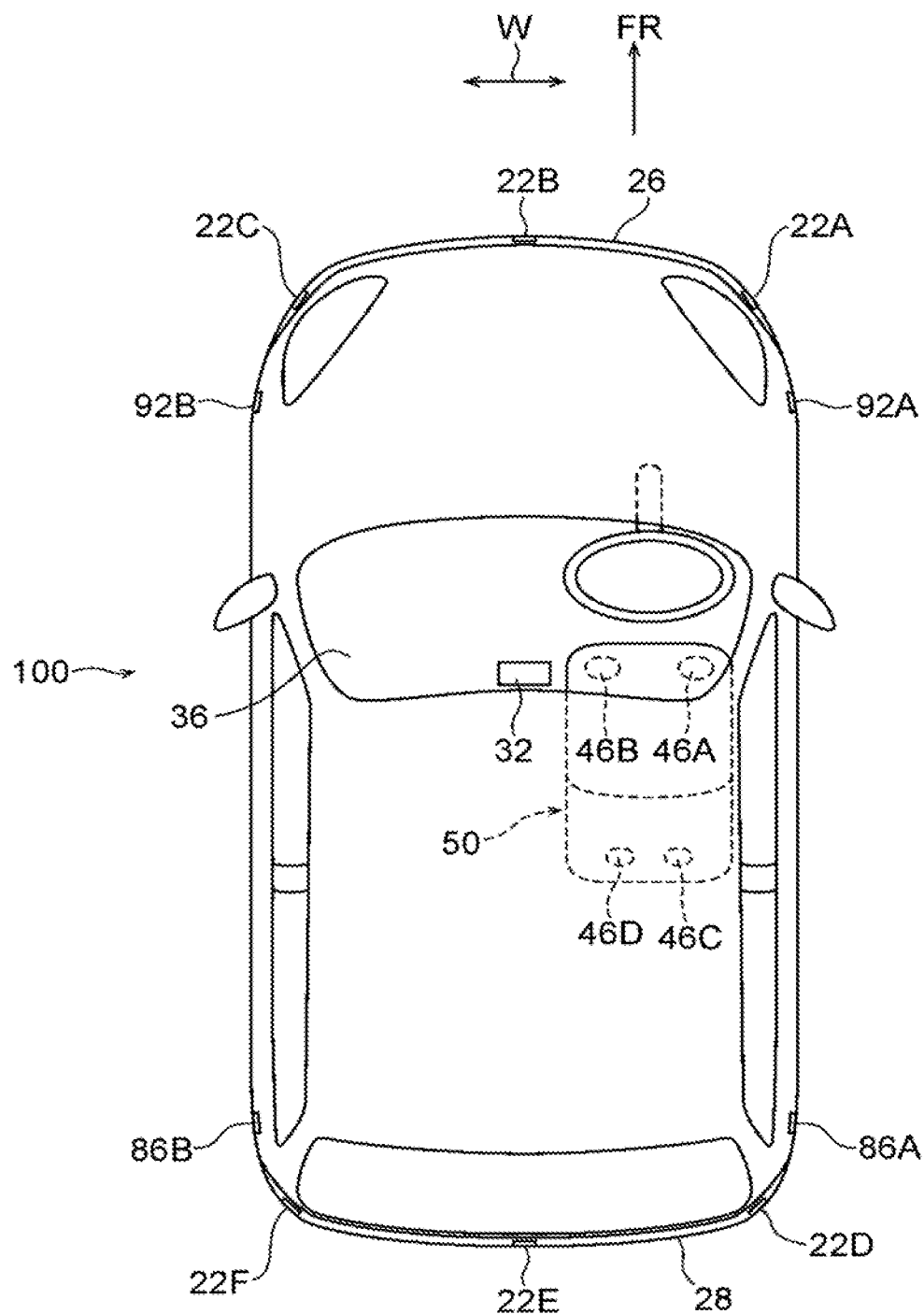
FIG. 14 is a schematic plan view illustrating one example of a vehicle mounted with the attention attracting device for a vehicle according to the second embodiment.

An attention attracting device for a vehicle according to a second embodiment of the present disclosure will be described with reference to FIGS. 12 to 20. FIG. 12 is a block diagram illustrating a functional configuration of an attention attracting device 80 for a vehicle according to the present embodiment, and FIG. 13 is a block diagram illustrating one example of a schematic configuration of the attention attracting device 80 for a vehicle. FIG. 14 is a schematic plan view illustrating one example of the vehicle 100 mounted with the attention attracting device 80 for a vehicle. The present embodiment is substantially identical in configuration to the first embodiment except for the point described below. Accordingly, component units substantially identical to those of the first embodiment are designated by the same reference signs to omit the description thereof. Although the vehicle 100 illustrated in FIG. 14 is different from the vehicle 100 (see FIG. 4) of the first embodiment in that the attention attracting device 10 for a vehicle (see FIG. 2 or the like) of the first embodiment is replaced with the attention attracting device 80 for a vehicle (see FIG. 13 or the like), the vehicle of the present embodiment is designated by the same reference sign as the vehicle 100 of the first embodiment for the sake of convenience.

An information detection unit 82 illustrated to FIG. 12 is a functional unit that detects a plurality of types of attention information around the own vehicle. In the present embodiment, the information detection unit 82 includes, in addition to the first information detection unit 12A and the second information detection unit 12B, a third information detection unit 12C and a fourth information detection unit 12D.

The third information detection unit 12C is a functional unit that detects attention information at the time of lane change and reverse traveling with use of BSM sensors 86A, 86B and BSM-ECUs 88A, 88B illustrated in FIG. 13. In the present embodiment, a component unit composed of the BSM sensors 86A, 86B and the BSM-ECUs 88A, 88B to function as the third information detection unit 12C (see FIG. 12) is referred to as a blind spot monitor-rear cross traffic alert detection mechanism 84. The blind spot monitor-rear cross traffic alert detection mechanism 84 is hereinafter referred to as "BSM-RCTA detection mechanism 84" for short.

As illustrated in FIG. 14, the BSM sensor 86A is attached to a wheel house rear end part of a vehicle right-side portion, and the BSM sensor 86B is attached to a wheel house rear end part of a vehicle left-side portion. The BSM sensors 86A, 86B are radar sensors that transmit radar waves to detect other vehicles in one example. As illustrated in FIG. 13, the BSM sensors 86A is connected to the BSM-ECU 88A to output a detection signal to the BSM-ECU 88A. The BSM sensor 86B is connected to the BSM-ECU 88B to output a detection signal to the BSM-ECU 88B. The BSM-ECUs 88A, 88B each include a CPU, a RAM, a ROM, and an input-output interface unit (input-output). The ROM stores a determination control program. The BSM-ECUs 88A, 88B determine, at the time of a lane change of the own vehicle, whether or not another vehicle is present on an oblique rear side (in a target lane) that is a dead angle of a rear visual recognition mirror, based on the detection signals from the BSM sensors 86A, 86B. When the own vehicle starts to move from a parking position in a reverse travel mode, the BSM-ECUs 88A, 88B determine whether or not there is another vehicle that is approaching so as to cross the rear side of the own vehicle. The BSM-ECUs 88A, 88B are also connected to the controller 70 through the CAN to output signals relating to attention information to the controller 70.

The fourth information detection unit 12D illustrated in FIG. 12 is a functional unit composed of FCTA sensors 92A, 92B and FCTA-ECUs 94A, 94B illustrated in FIG. 13 to detect attention information at the time of entering an intersection of poor visibility or the like. In the present embodiment, a component unit composed of the FCTA sensors 92A, 92B and the FCTA-ECUs 94A, 94B to function as the fourth information detection unit 12D (see FIG. 12) is referred to as a front cross traffic alert detection mechanism 90. The front cross traffic alert detection mechanism 90 is hereinafter referred to as "FCTA detection mechanism 90" for short.

As illustrated in FIG. 14, the FCTA sensor 92A is attached to a wheel house front end part of the vehicle right-side portion, and the FCTA sensor 92B is attached to a wheel house front end part of the vehicle left-side portion. The FCTA sensors 92A, 92B are radar sensors that transmit radar waves to detect another vehicle in one example. As illustrated in FIG. 13, the FCTA sensors 92A is connected to the FCTA-ECU 94A to output a detection signal to the FCTA-ECU 94A. The FCTA sensor 92B is connected to the FCTA-ECU 94B to output a detection signal to the FCTA-ECU 94B. The FCTA-ECUs 94A, 94B each include a CPU, a RAM, a ROM, and an input-output interface unit (input-output). The ROM stores a determination control program. The FCTA-ECUs 94A, 94B determine, based on the detection signals from the FCTA sensors 92A, 92B, whether or not there is another vehicle that is approaching so as to cross the front side of the own vehicle when the own vehicle enters an intersection of poor visibility or the like. The FCTA-ECUs 94A, 94B are also connected to the controller 70 through the CAN to output signals relating to attention information to the controller 70.

The vibration control ECU 42 illustrated in FIG. 13 is different from the vibration control ECU 42 (see FIG. 2) of the first embodiment in that the executed vibration control program is a program for the present embodiment. However, the configuration of the vibration control ECU 42 illustrated in FIG. 13 is similar in other points to that of the vibration control ECU 42 of the first embodiment. Accordingly, the vibration control ECU 42 of the present embodiment is designated by the same reference sign as the vibration control ECU 42 of the first embodiment for the sake of convenience. The display control ECU 62 is different from the display control ECU 62 (see FIG. 2) of the first embodiment in that the executed display control program is a program for the present embodiment. However, the configuration of the display control ECU 62 is similar in other points to that of the display control ECU 62 of the first embodiment. Accordingly, the display control ECU 62 of the present disclosure is designated by the same reference sign as the display control ECU 62 of the first embodiment for the sake of convenience.

Figure 15B:
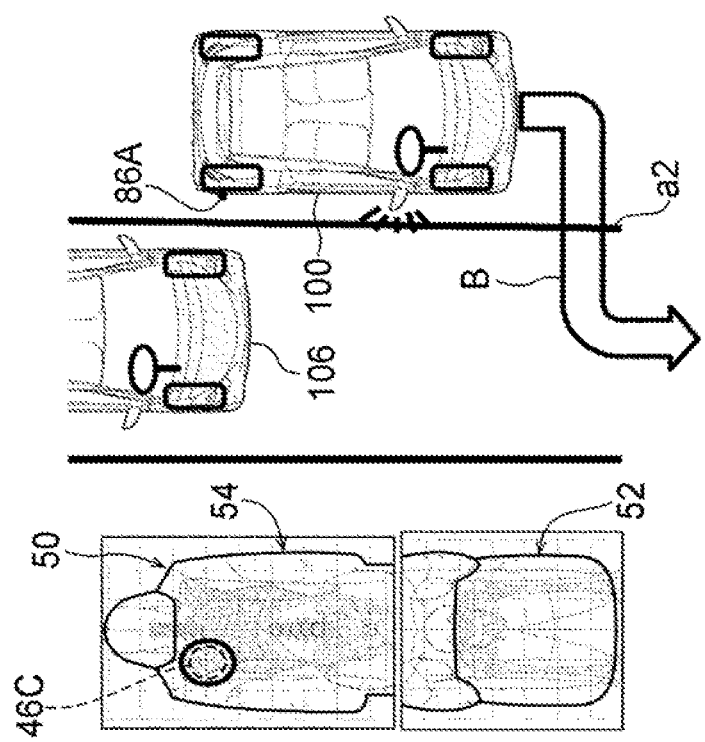
FIG. 15B is a schematic view illustrating another example of the relation between attention information at the time of a lane change detected with the BSM-RCTA detection mechanism and a vibration position.
Figure 15A:
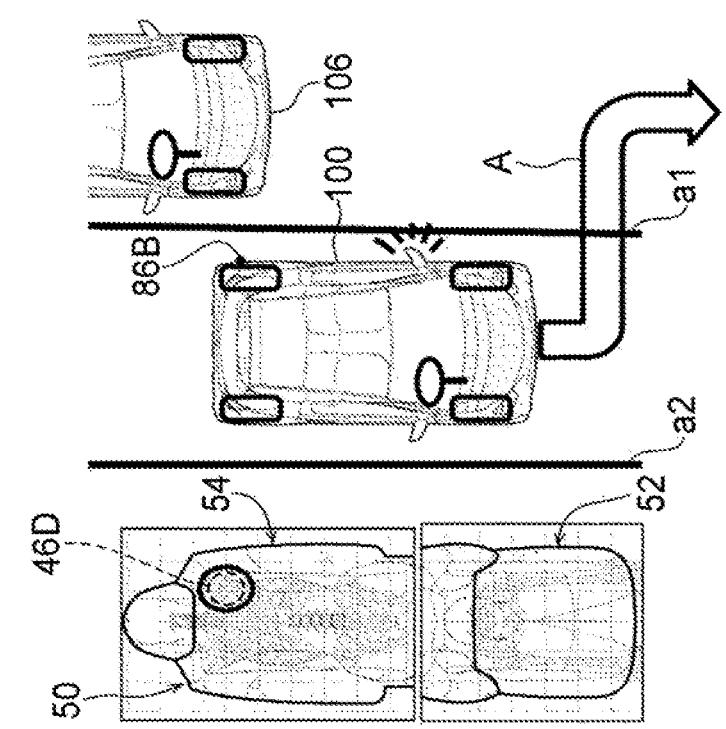
FIG. 15A is a schematic view illustrating one example of a relation between attention information at the time of a lane change detected with a BSM-RCTA detection mechanism and a vibration position.
Figure 16:
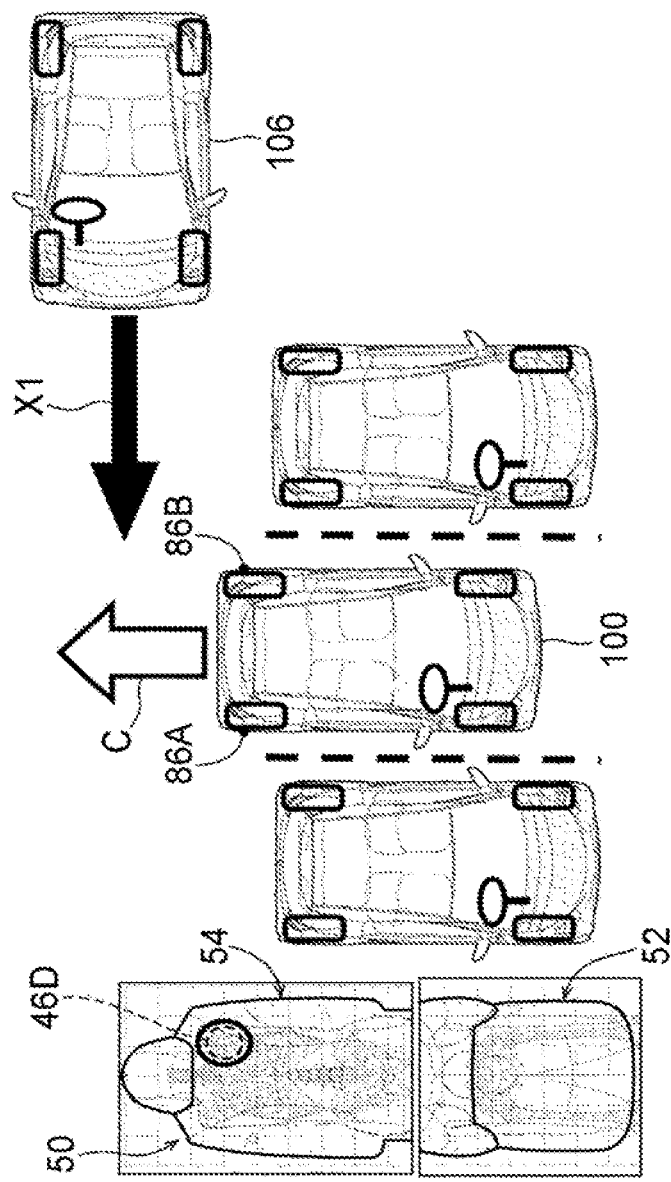
FIG. 16 is a schematic view illustrating a relation between attention information at the time of reverse traveling detected with the BSM-RCTA detection mechanism and a vibration position.

Here, a relation between the attention information around the own vehicle and application of vibration to the vehicular seat 50 (see FIGS. 14 and 15) is described with reference to FIGS. 15A to 17. FIGS. 15A, 15B, and 16 illustrate a relation between the attention information detected with the BSM-RCTA detection mechanism 84 (see FIG. 13) and vibration positions. FIG. 17 illustrates a relation between the attention information detected with the FCTA detection mechanism 90 (see FIG. 13) and the vibration positions. In each of FIGS. 15A, 15B, 16, and 17, the own vehicle and the surrounding condition of the own vehicle are illustrated on the right-hand side, and the vibration position of the vehicular seat 50 is illustrated on the left-hand side of the drawings. In each of the drawings, a portion generally corresponding to the region to be vibrated in the vehicular seat 50 is surrounded with a thick circle for easy understanding.

As illustrated in FIG. 15A, when the own vehicle 100 attempts to make a lane change to the left (see an arrow A) and at that time, the BSM sensor 86B detects another vehicle 106 on the left-hand side of the own vehicle 100, the vibration control ECU 42 (see FIG. 13, hereinafter description of reference drawings may properly be omitted) vibrates the vibrator 46D on the left rear side of the vehicular seat 50. As illustrated in FIG. 15B, when the own vehicle 100 attempts to make a lane change to the right (see an arrow B) and at that time, the BSM sensor 86A detects another vehicle 106 on the right-hand side of the own vehicle 100, the vibration control ECU 42 vibrates the vibrator 46C on the right rear side of the vehicular seat 50.

As illustrated in FIG. 16, when the own vehicle 100 attempts to start traveling from a parking position in a reverse travel mode (see an arrow C) and at that time, the BSM sensor 86B detects another vehicle 106 approaching the left rear side of the own vehicle 100 (i.e., traveling in an arrow X1 direction), the vibration control ECU 42 vibrates the vibrator 46D on the left rear side of the vehicular seat 50. Although not illustrated, when the own vehicle 100 attempts to start traveling from a parking position in the reverse travel mode and at that time, the BSM sensor 86A detects another vehicle approaching the right rear side of the own vehicle 100, the vibration control ECU 42 vibrates the vibrator 46C on the right rear side of the vehicular seat 50.

As illustrated in FIG. 17, when the own vehicle 100 attempts to enter an intersection of poor visibility or the like (see an arrow D) and at that time, the FCTA sensor 92B detects another vehicle 106 approaching the left front side of the own vehicle 100 (i.e., traveling in an arrow X2 direction), the vibration control ECU 42 vibrates the vibrator 46B on the left front side of the vehicular seat 50. Although not illustrated, when the own vehicle 100 attempts to enter an intersection of poor visibility or the like and at that time, the FCTA sensor 92A detects another vehicle approaching the right front side of the own vehicle 100, the vibration control ECU 42 vibrates the vibrator 46A on the right front side of the vehicular seat 50.

Figure 18A:
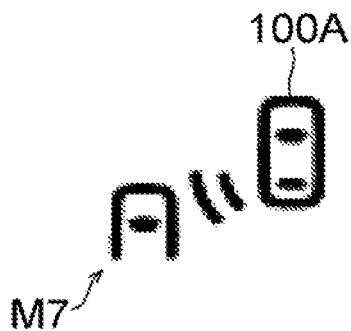
FIG. 18A illustrates a display example when attention information at the time of a lane change is detected with the BSM-RCTA detection mechanism.
Figure 18B:
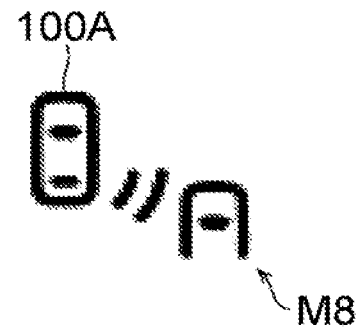
FIG. 18B illustrates another display example when attention information at the time of a lane change is detected with the BSM-RCTA detection mechanism.
Figure 19:
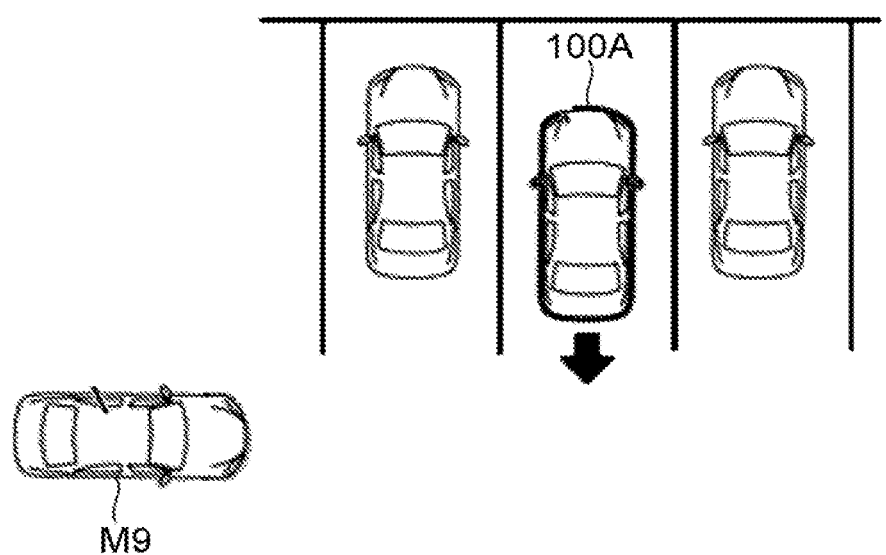
FIG. 19 illustrates a display example when attention information at the time of reverse traveling is detected with the BSM-RCTA detection mechanism.
Figure 20:
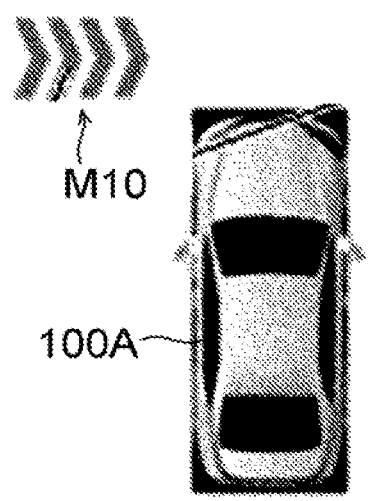
FIG. 20 illustrates a display example when attention information is detected with the FCTA detection mechanism.

A description of display examples of the attention information displayed on the meter display device 64 (see FIG. 6) is now given with reference to FIGS. 18A to 20. FIGS. 18A, 18B, and 19 illustrate display examples in the case of detecting attention information with the BSM-RCTA detection mechanism 84 (see FIG. 13). FIG. 20 illustrates a display example in the case of detecting attention information with the FCTA detection mechanism 90 (see FIG. 13).

FIG. 18A is a display example when the own vehicle attempts to make a lane change to the left and at that time, another vehicle is detected on the left rear side of the own vehicle. In this case, a mark M7 representing the presence of another vehicle is displayed on the left rear side of the mark 100A of the own vehicle. FIG. 18B is a display example when the own vehicle attempts to make a lane change to the right and at that time, another vehicle is detected on the right rear side of the own vehicle. In this case, a mark M8 representing the presence of another vehicle is displayed on the right rear side of the mark 100A of the own vehicle.

FIG. 19 is a display example when the own vehicle starts to travel from a parking position in the reverse travel mode and at that time, another vehicle approaching the left rear side of the own vehicle is detected. In this case, a mark M9 or the like representing the presence of another vehicle approaching is displayed. Although not illustrated, a right and left reversed image of FIG. 19 is displayed when the own vehicle starts to travel from a parking position in the reverse travel mode and at that time, another vehicle approaching the right rear side of the own vehicle is detected.

FIG. 20 is a display example when the own vehicle attempts to enter an intersection of poor visibility or the like and at that time, another vehicle approaching the left front side of the own vehicle is detected. In this case, a mark M10 representing the presence of another vehicle is displayed on the left front side of the mark 100A of the own vehicle. Although not illustrated, a right and left reversed image of FIG. 20 is displayed when the own vehicle attempts to enter an intersection of poor visibility or the like and at that time, another vehicle approaching the right front side of the own vehicle is detected.

Next, functions and effects of the above embodiment will be described. The flow of the vibration control process executed by the vibration control ECU 42 illustrated in FIG. 13 is similar to the flow illustrated in FIG. 7A, and the flow of the display control process executed by the display control ECU 62 is similar to the flow illustrated in FIG. 7B.

First, the effects when the clearance sonar detection mechanism 20 illustrated in FIG. 13 detects attention information in any one region in the vicinity of the front bumper and the rear bumper, and the effects when the LDA detection mechanism 30 detects attention information about a lane departure are similar to those of the first embodiment.

When the BSM-RCTA detection mechanism 84 illustrated in FIG. 13 detects attention information at the time of a lane change, the attention information is transmitted to the vibration control ECU 42 and the display control ECU 62 via the controller 70. The vibration control ECU 42 controls operation of the vibrators 46A to 46D so as to vibrate a region corresponding to the detection position of the attention information as illustrated in FIGS. 15A and 15B. The display control ECU 62 illustrated in FIG. 13 displays the content corresponding to the attention information (one of FIGS. 18A and 18B) on the screen of the meter display device 64.

When the BSM-RCTA detection mechanism 84 illustrated in FIG. 13 detects attention information at the time of reverse traveling, the attention information is transmitted to the vibration control ECU 42 and the display control ECU 62 via the controller 70. The vibration control ECU 42 controls operation of the vibrators 46A to 46D so as to vibrate a region corresponding to the detection position of the attention information as illustrated in FIG. 16. The display control ECU 62 illustrated in FIG. 13 displays the content corresponding to the attention information (FIG. 19 or a right and left reversed image of FIG. 19) on the screen of the meter display device 64.

When the FCTA detection mechanism 90 illustrated in FIG. 13 detects attention information at the time of entering an intersection with poor visibility or the like, the attention information is transmitted to the vibration control ECU 42 and the display control ECU 62 via the controller 70. The vibration control ECU 42 controls operation of the vibrators 46A to 46D so as to vibrate a region corresponding to the detection position of the attention information as illustrated in FIG. 17. The display control ECU 62 illustrated in FIG. 13 displays the content corresponding to the attention information (FIG. 20 or a right and left reversed image of FIG. 20) on the screen of the meter display device 64.

As described in the foregoing, the present embodiment can also transmit a plurality of types of attention information through vibration of the vehicular seat 50 (see FIG. 14), and also enables a sitting occupant to easily understand the meaning and the content of the attention attracting information transmitted through vibration of the vehicular seat 50.

Supplementary Description of Embodiments

As a modification of the above embodiment, the vibration application unit may be able to apply vibration to one to three regions, or five or more regions of the vehicular seat, for example. As an example where the vibration application unit can apply vibration to five or more regions of the vehicular seat, the vibration application unit (16) may be a component unit capable of applying vibration to regions, such as a front-side intermediate portion between the right and left front portions to be vibrated 52R, 52L, and a rear-side intermediate portion between the right and left rear portions to be vibrated 54R, 54L, in addition to the right and left front portions to be vibrated 52R, 52L, and the right and left rear portions to be vibrated 54R, 54L illustrated in FIG. 5. In this case, when, for example, the clearance sonar sensor (22B) detects an obstacle right in front of the own vehicle (100), the control unit (14) may be configured to control operation of the vibration application unit (16) such that the vibration application unit (16) applies vibration to the front-side intermediate portion in place of the right and left front portions to be vibrated (52R, 52L) or together with the right and left front portions to be vibrated (52R, 52L). When the clearance sonar sensor (22E) detects an obstacle right behind the own vehicle (100), the control unit (14) may be configured to control operation of the vibration application unit (16) such that the vibration application unit (16) applies vibration to the rear-side intermediate portion in place of the right and left rear portions to be vibrated (54R, 54L) or together with the right and left rear portions to be vibrated (54R, 54L).

As a modification of the above embodiment, the control unit may be configured to control operation of the vibration application unit such that the vibration application unit changes a vibration pattern of vibration applied to the vehicular seat, in accordance with the content of the detected attention information, the vibration pattern including a vibration frequency, a vibration amplitude, a vibration length, the number of repetitions of vibration, and a vibration interval.

As a modification of the above embodiment, an intermediate portion of the front bumper 26 of the vehicle 100 illustrated in FIG. 4 or other drawings may be configured to have a plurality of clearance sonar sensors attached in a vehicle width direction such that the clearance sonar sensors are provided side by side in the vehicle width direction. Alternatively, an intermediate portion of the rear bumper 28 of the vehicle 100 may be configured to have a plurality of clearance sonar sensors attached in a vehicle width direction such that the clearance sonar sensors are provided side by side in the vehicle width direction.

As a modification of the second embodiment, the attention attracting device may be configured such that one of or both the clearance sonar detection mechanism 20 and the LDA detection mechanism 30 are excluded.

As a modification of the embodiment, the controller 70, the vibration control ECU 42, and the display control ECU 62 illustrated in FIGS. 2 and 13 may be configured to be integrated.

Incidentally, the vehicle mounted with the attention attracting devices 10, 80 for a vehicle in the above embodiments may be mounted with a lane keeping assist control system called lane keeping assist (LKA).

The above embodiments and the above-described modifications may be implemented in proper combinations.

Although examples of the present disclosure have been described, the present disclosure is not limited to the examples disclosed. It is naturally understood that various changes are possible without departing from the concept of the present disclosure.

What is claimed is:

1. An attention attracting device for a vehicle, comprising:
an electronic control unit configured to:
detect attention information of a plurality of types of attention information around the vehicle;
apply vibration, by using a vibrator, to a vehicular seat when the attention information is detected; and
display, using a display, attention information content corresponding to the attention information when the attention information is detected, wherein
the attention information content includes information of a risk including a graphic image representing both a type of the risk and a position where the risk occurs,
the graphic image is one a plurality of different graphic images each representing a different one of the plurality of types of attention information,
each of the plurality of different graphic images includes a different visual representation of the vehicle with respect to a corresponding attention information around the vehicle,
the electronic control unit is configured to apply vibration to regions of the vehicular seat, the regions including
a right front portion to be vibrated that is a region on a seat surface side and a right front-end side of a seat cushion in the vehicular seat,
a left front portion to be vibrated that is a region on the seat surface side and a left front-end side of the seat cushion in the vehicular seat,
a right rear portion to be vibrated that is a region on a backrest surface side and a right upper-end side of a seatback in the vehicular seat, and
a left rear portion to be vibrated that is a region on the backrest surface side and a left upper-end side of the seatback in the vehicular seat, and
the electronic control unit is configured to:
when the electronic control unit detects the attention information and a detection position at which the electronic control unit detects the attention information for the vehicle is at least one side of a right front side, a left front side, a right rear side, and a left rear side of the vehicle, control an operation of the vibrator such that the vibrator applies vibration to a region on a side corresponding to the detection position as seen in a plan view of the vehicle, the region being among the right front portion to be vibrated, the left front portion to be vibrated, the right rear portion to be vibrated, and the left rear portion to be vibrated;
when the detection position is right in front of the vehicle, control the operation of the vibrator such that the vibrator applies vibration to both the right front portion to be vibrated and the left front portion to be vibrated; and
when the detection position is right behind the vehicle, control the operation of the vibrator such that the vibrator applies vibration to both the right rear portion to be vibrated and the left rear portion to be vibrated.

2. The attention attracting device according to claim 1, wherein
a vibration pattern is set in accordance with content of each of the plurality of types of attention information, and
the electronic control unit is configured to operate the vibrator with a vibration pattern corresponding to the attention information content corresponding to the attention information.

3. The attention attracting device according to claim 1, wherein the plurality of types of attention information includes information on an obstacle around the vehicle detected using ultrasonic waves and information indicating a lane departure or a lane departure possibility of the vehicle.

4. The attention attracting device according to claim 1, wherein
the attention information is information obtained by a clearance sonar detecting mechanism or information obtained by a lane departure alert detecting mechanism, and
the electronic control unit is configured to display the attention information content including the visual representation of the vehicle and a mark corresponding to the position when the attention information is information obtained by the clearance sonar detecting mechanism or the visual representation of the vehicle and a side line corresponding to the position when the attention information is information obtained by the lane departure alert detecting mechanism.

5. The attention attracting device according to claim 1, wherein
the attention information is information obtained by a clearance sonar detecting mechanism or information obtained by a lane departure alert detecting mechanism, and
the electronic control unit is configured to:

display the attention information content including the visual representation of the vehicle and a mark corresponding to the position when the attention information is information obtained by the clearance sonar detecting mechanism; and display the attention information content including the visual representation of the vehicle and a side line corresponding to the position when the attention information is information obtained by the lane departure alert detecting mechanism.

6. The attention attracting device according to claim 1, wherein the attention information is information obtained by a clearance sonar detecting mechanism, information obtained by a lane departure alert detecting mechanism, information obtained by a blind spot monitor-rear cross traffic alert detection mechanism, or information obtained by a front cross traffic alert detection mechanism, and the electronic control unit is configured to display the attention information content including the visual representation of the vehicle and a first mark corresponding to the position when the attention information is information obtained by the clearance sonar detecting mechanism, the visual representation of the vehicle and a side line corresponding to the position when the attention information is information obtained by the lane departure alert detecting mechanism, the visual representation of the vehicle and another vehicle corresponding to the position when the attention information is information obtained by the blind spot monitor-rear cross traffic alert detection mechanism, or the visual representation of the vehicle and a second mark corresponding to the position when the attention information is information obtained by the front cross traffic alert detection mechanism.

7. The attention attracting device according to claim 1, wherein the attention information is information obtained by a clearance sonar detecting mechanism, information obtained by a lane departure alert detecting mechanism, information obtained by a blind spot monitor-rear cross traffic alert detection mechanism, or information obtained by a front cross traffic alert detection mechanism, and the electronic control unit is configured to:

display the attention information content including the visual representation of the vehicle and a first mark corresponding to the position when the attention information is information obtained by the clearance sonar detecting mechanism;

display the attention information content including the visual representation of the vehicle and a side line corresponding to the position when the attention information is information obtained by the lane departure alert detecting mechanism;

display the attention information content including the visual representation of the vehicle and another vehicle corresponding to the position when the attention information is information obtained by the blind spot monitor-rear cross traffic alert detection mechanism; and display the attention information content including the visual representation of the vehicle and a second mark corresponding to the position when the attention information is information obtained by the front cross traffic alert detection mechanism.

8. The attention attracting device according to claim 1, wherein the graphic image includes a representation of a position of a vehicle detected as the attention information with respect to the vehicle.

9. The attention attracting device according to claim 8, wherein the graphic image includes depiction of the vehicle detected as the attention information and the vehicle.

10. An attention attracting device for a vehicle, comprising:

an electronic control unit configured to:

detect attention information of a plurality of types of attention information around the vehicle;

apply vibration, by using a vibrator, to a vehicular seat when the attention information is detected; and display, using a display, attention information content corresponding to the attention information when the attention information is detected, wherein the attention information content includes information of a risk including a graphic image representing both a type of the risk and a position where the risk occurs, the graphic image is one a plurality of different graphic images each representing a different one of the plurality of types of attention information, each of the plurality of different graphic images includes a different visual representation of the vehicle with respect to a corresponding attention information around the vehicle, a vibration pattern is set in accordance with content of each of the plurality of types of attention information, the electronic control unit is configured to operate the vibrator with a vibration pattern corresponding to the attention information content corresponding to the attention information, the attention information is information obtained by a clearance sonar detecting mechanism or information obtained by a lane departure alert detecting mechanism, and the electronic control unit is configured to display the attention information content including the visual representation of the vehicle and a mark corresponding to the position when the attention information is information obtained by the clearance sonar detecting mechanism or the visual representation of the vehicle and a side line corresponding to the position when the attention information is information obtained by the lane departure alert detecting mechanism.

11. The attention attracting device according to claim 10, wherein the electronic control unit is configured to apply vibration to regions of the vehicular seat, the regions including a right front portion to be vibrated that is a region on a seat surface side and a right front-end side of a seat cushion in the vehicular seat, a left front portion to be vibrated that is a region on the seat surface side and a left front-end side of the seat cushion in the vehicular seat, a right rear portion to be vibrated that is a region on a backrest surface side and a right upper-end side of a seatback in the vehicular seat, and a left rear portion to be vibrated that is a region on the backrest surface side and a left upper-end side of the seatback in the vehicular seat, and the electronic control unit is configured to:

when the electronic control unit detects the attention information and a detection position at which the electronic control unit detects the attention information for the vehicle is at least one side of a right front side, a left front side, a right rear side, and a left rear side of the vehicle, control an operation of the vibrator such that the vibrator applies vibration to a region on a side corresponding to the detection position as seen in a plan view of the vehicle, the region being among the right front portion to be vibrated, the left front portion to be vibrated, the right rear portion to be vibrated, and the left rear portion to be vibrated;

when the detection position is right in front of the vehicle, control the operation of the vibrator such that the vibrator applies vibration to both the right front portion to be vibrated and the left front portion to be vibrated; and when the detection position is right behind the vehicle, control the operation of the vibrator such that the vibrator applies vibration to both the right rear portion to be vibrated and the left rear portion to be vibrated.

12. The attention attracting device according to claim 10, wherein the plurality of types of attention information includes information on an obstacle around the vehicle detected using ultrasonic waves and information indicating a lane departure or a lane departure possibility of the vehicle.

13. The attention attracting device according to claim 10, wherein the electronic control unit is configured to:

display the attention information content including the visual representation of the vehicle and the mark corresponding to the position when the attention information is information obtained by the clearance sonar detecting mechanism; and display the attention information content including the visual representation of the vehicle and the side line corresponding to the position when the attention information is information obtained by the lane departure alert detecting mechanism.

14. The attention attracting device according to claim 10, wherein the attention information is information obtained by the clearance sonar detecting mechanism, information obtained by the lane departure alert detecting mechanism, information obtained by a blind spot monitor-rear cross traffic alert detection mechanism, or information obtained by a front cross traffic alert detection mechanism, and the electronic control unit is configured to display the attention information content including the visual representation of the vehicle and a first mark corresponding to the position when the attention information is information obtained by the clearance sonar detecting mechanism, the visual representation of the vehicle and the side line corresponding to the position when that the attention information is information obtained by the lane departure alert detecting mechanism, the visual representation of the vehicle and another vehicle corresponding to the position when the attention information is information obtained by the blind spot monitor-rear cross traffic alert detection mechanism, or the visual representation of the vehicle and a second mark corresponding to the position when the attention information is information obtained by the front cross traffic alert detection mechanism.

15. The attention attracting device according to claim 10, wherein the attention information is information obtained by the clearance sonar detecting mechanism, information obtained by the lane departure alert detecting mechanism, information obtained by a blind spot monitor-rear cross traffic alert detection mechanism, or information obtained by a front cross traffic alert detection mechanism, and the electronic control unit is configured to:

display the attention information content including the visual representation of the vehicle and a first mark corresponding to the position when the attention information is information obtained by the clearance sonar detecting mechanism;

display the attention information content including the visual representation of the vehicle and the side line corresponding to the position when the attention information is information obtained by the lane departure alert detecting mechanism;

display the attention information content including the visual representation of the vehicle and another vehicle corresponding to the position when the attention information is information obtained by the blind spot monitor-rear cross traffic alert detection mechanism; and display the attention information content including the visual representation of the vehicle and a second mark corresponding to the position when the attention information is information obtained by the front cross traffic alert detection mechanism.

16. The attention attracting device according to claim 10, wherein the graphic image includes a representation of a position of a vehicle detected as the attention information with respect to the vehicle.

17. The attention attracting device according to claim 16, wherein the graphic image includes depiction of the vehicle detected as the attention information and the vehicle.

* * * * *